(12) United States Patent
Ichiki

(10) Patent No.: US 10,003,272 B2
(45) Date of Patent: Jun. 19, 2018

(54) THREE-PHASE/SINGLE-PHASE MATRIX CONVERTER

(71) Applicant: FUJITSU GENERAL LIMITED, Kanagawa (JP)

(72) Inventor: Satoshi Ichiki, Kanagawa (JP)

(73) Assignee: FUJITSU GENERAL LIMITED, Kanagawa (JP)

( * ) Notice: Subject to any disclaimer, the term of this patent is extended or adjusted under 35 U.S.C. 154(b) by 0 days. days.

(21) Appl. No.: 15/554,130

(22) PCT Filed: Mar. 25, 2016

(86) PCT No.: PCT/JP2016/059775
§ 371 (c)(1),
(2) Date: Aug. 28, 2017

(87) PCT Pub. No.: WO2016/158805
PCT Pub. Date: Oct. 6, 2016

(65) Prior Publication Data
US 2018/0048242 A1    Feb. 15, 2018

(30) Foreign Application Priority Data

Mar. 27, 2015 (JP) ................. 2015-067241

(51) Int. Cl.
*H02M 5/293* (2006.01)
*H02M 5/27* (2006.01)
*H02M 5/297* (2006.01)

(52) U.S. Cl.
CPC ............ *H02M 5/27* (2013.01); *H02M 5/297* (2013.01)

(58) Field of Classification Search
CPC ............ H02M 5/00; H02M 5/02; H02M 5/12; H02M 5/14; H02M 5/27; H02M 7/217;
(Continued)

(56) References Cited

U.S. PATENT DOCUMENTS 7,881,087 B2 *    2/2011 Sakakibara ........... H02M 5/275
                                                363/159
2010/0091534 A1 *  4/2010 Tadano ................. H02M 5/293
                                                363/157

(Continued)

FOREIGN PATENT DOCUMENTS

JP    2010-148334 A    7/2010
JP    2010-263702 A    11/2010

(Continued)

OTHER PUBLICATIONS

International Search Report issued in Application No. PCT/JP2016/059775 dated Jun. 14, 2016, with English translation.

(Continued)

*Primary Examiner* — Nguyen Tran
(74) *Attorney, Agent, or Firm* — McDermott Will & Emery LLP

(57) ABSTRACT

A configuration for the object includes: a bidirectional switch circuit which turns ON/OFF supply of input three-phase AC power to a load LD; and a control unit which performs virtual AC/DC conversion processing in which a plurality of interline voltage generation sections selecting two phases among the input three-phase AC power are obtained according to a plurality of modes classified according to a magnitude relationship between voltages of respective phases in the input three-phase AC power within a predetermined switching cycle and generates a switching pattern of the bidirectional switch circuit so as to perform virtual DC/AC conversion processing corresponding to the plurality of interline voltage generation sections from a second carrier waveform pattern according to the plurality of modes and a U-phase control signal and a V-phase control signal corresponding to a phase of an output side.

11 Claims, 9 Drawing Sheets

(58) Field of Classification Search
CPC .. H02M 7/4807; H02M 1/4216; H02M 5/257; H02M 5/271; H02M 5/272; H02M 5/273; H02K 47/22; H02K 47/30; H01F 38/04; H01F 30/14; G01R 25/00
See application file for complete search history.

(56) References Cited

U.S. PATENT DOCUMENTS

| | | |
|---|---|---|
| 2011/0122661 A1 | 5/2011 | Sakakibara |
| 2012/0287686 A1* | 11/2012 | Yamamoto ............ H02M 5/293 363/78 |
| 2014/0226386 A1 | 8/2014 | Saito et al. |
| 2015/0372610 A1 | 12/2015 | Ichiki |

FOREIGN PATENT DOCUMENTS

| | | |
|---|---|---|
| JP | 2013-055868 A | 3/2013 |
| JP | 2013-158064 A | 8/2013 |
| JP | 2014-143825 A | 8/2014 |
| WO | 2010/001739 A1 | 1/2010 |

OTHER PUBLICATIONS

Office Action issued in Japanese Application No. 2015-067241 dated Jun. 14, 2016, with English translation.

\* cited by examiner

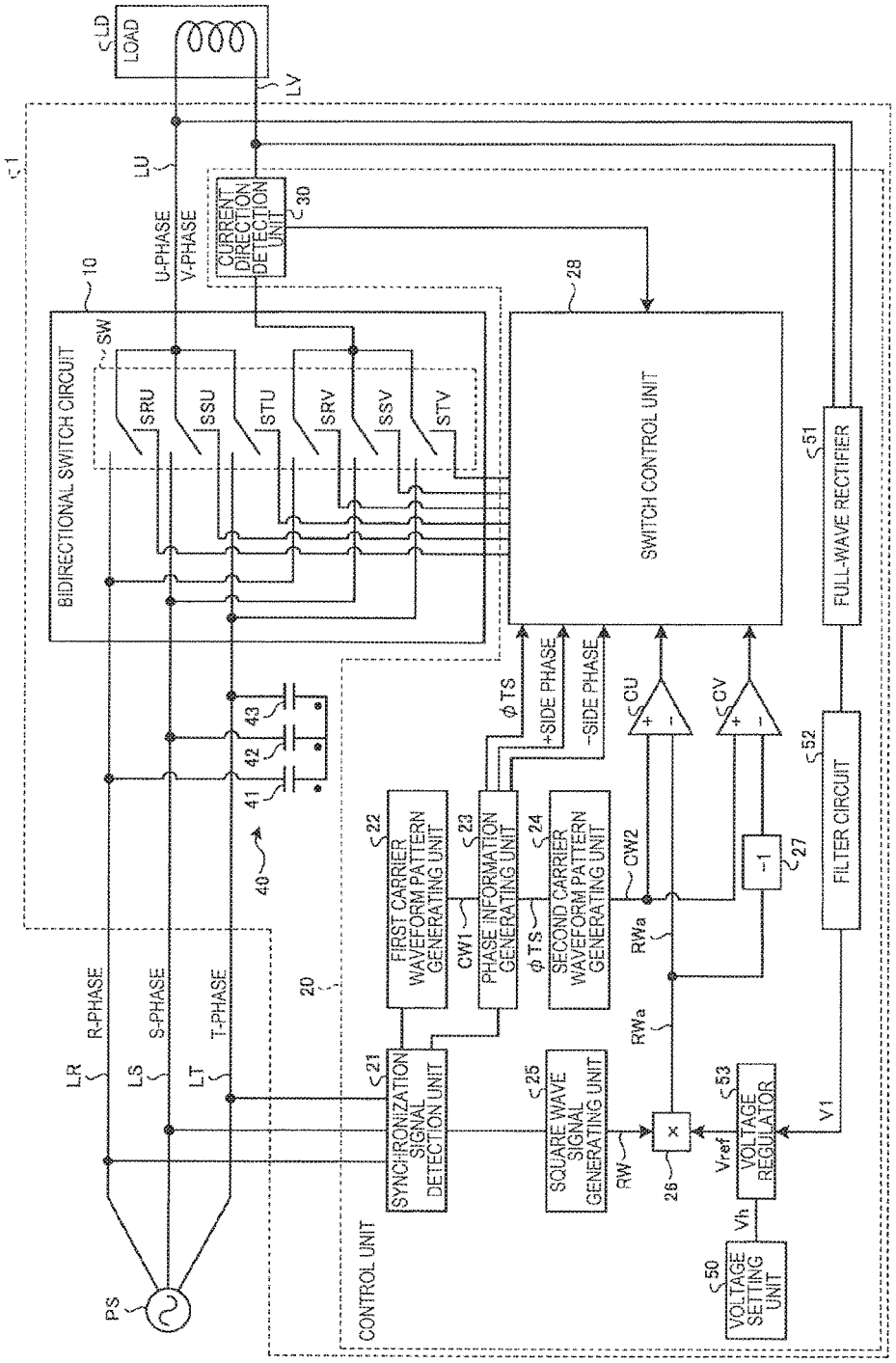
[Fig. 1]

[Fig. 2]
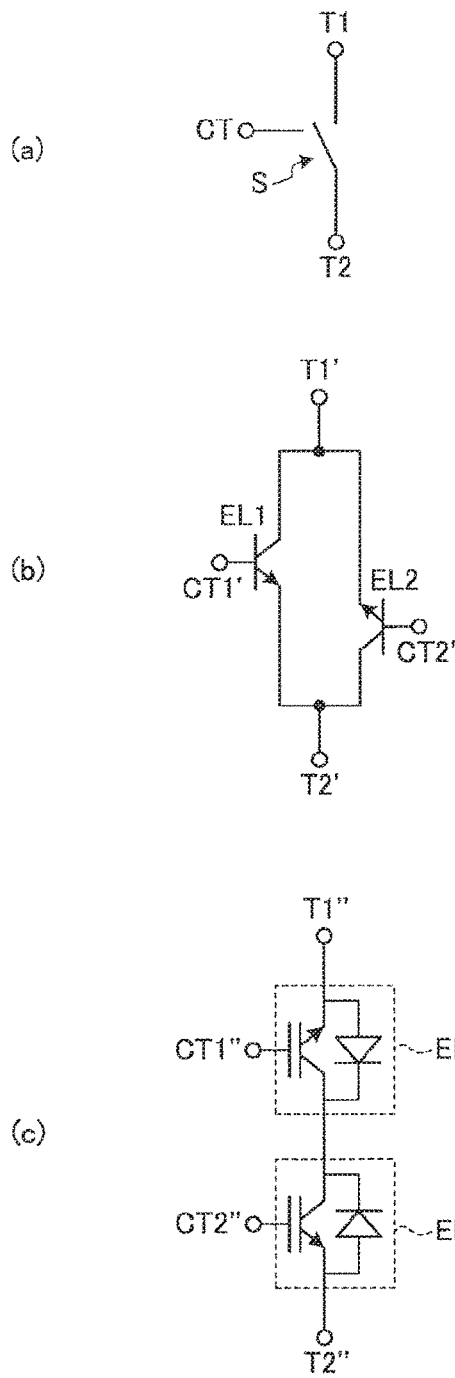

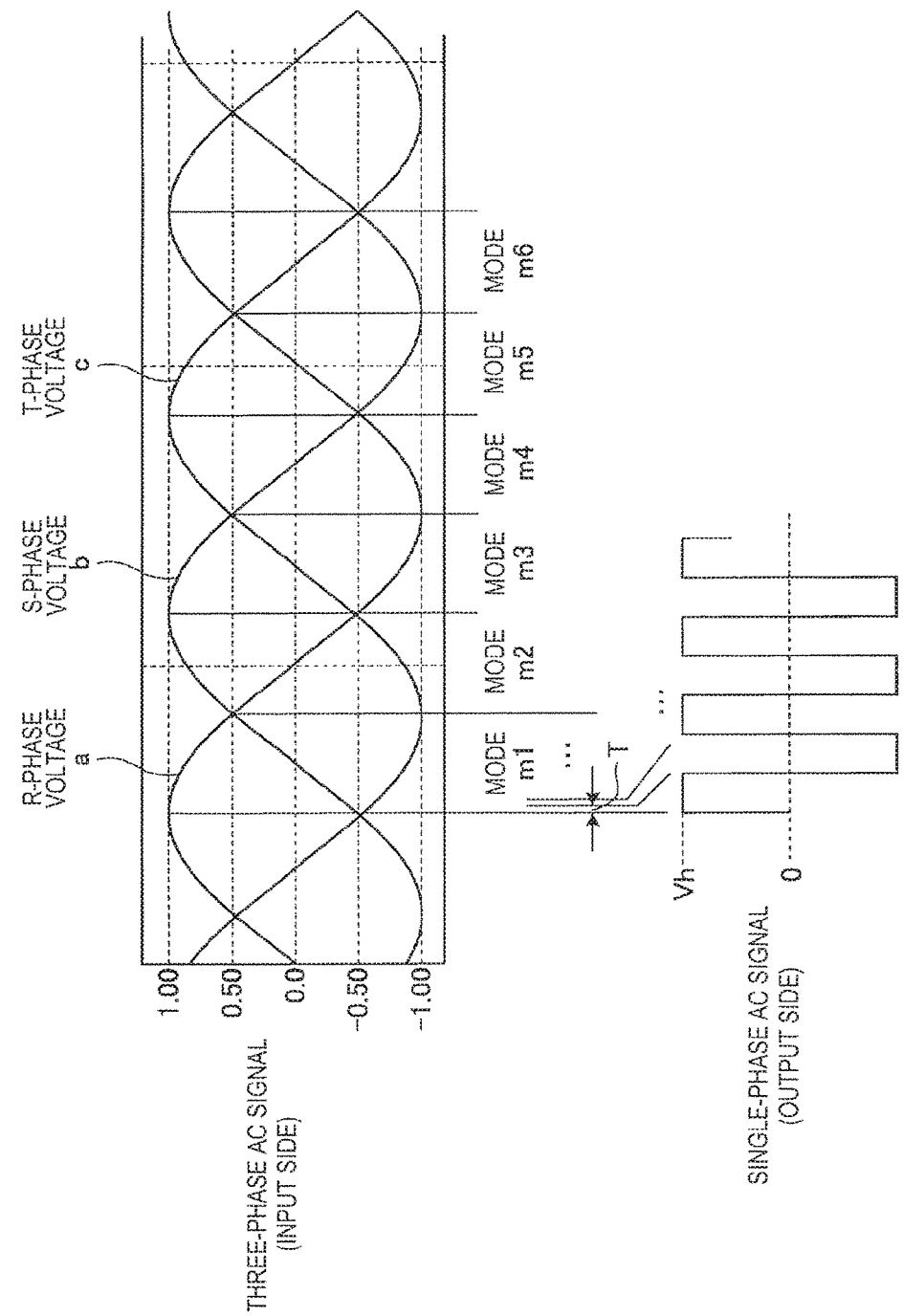

[Fig. 4]
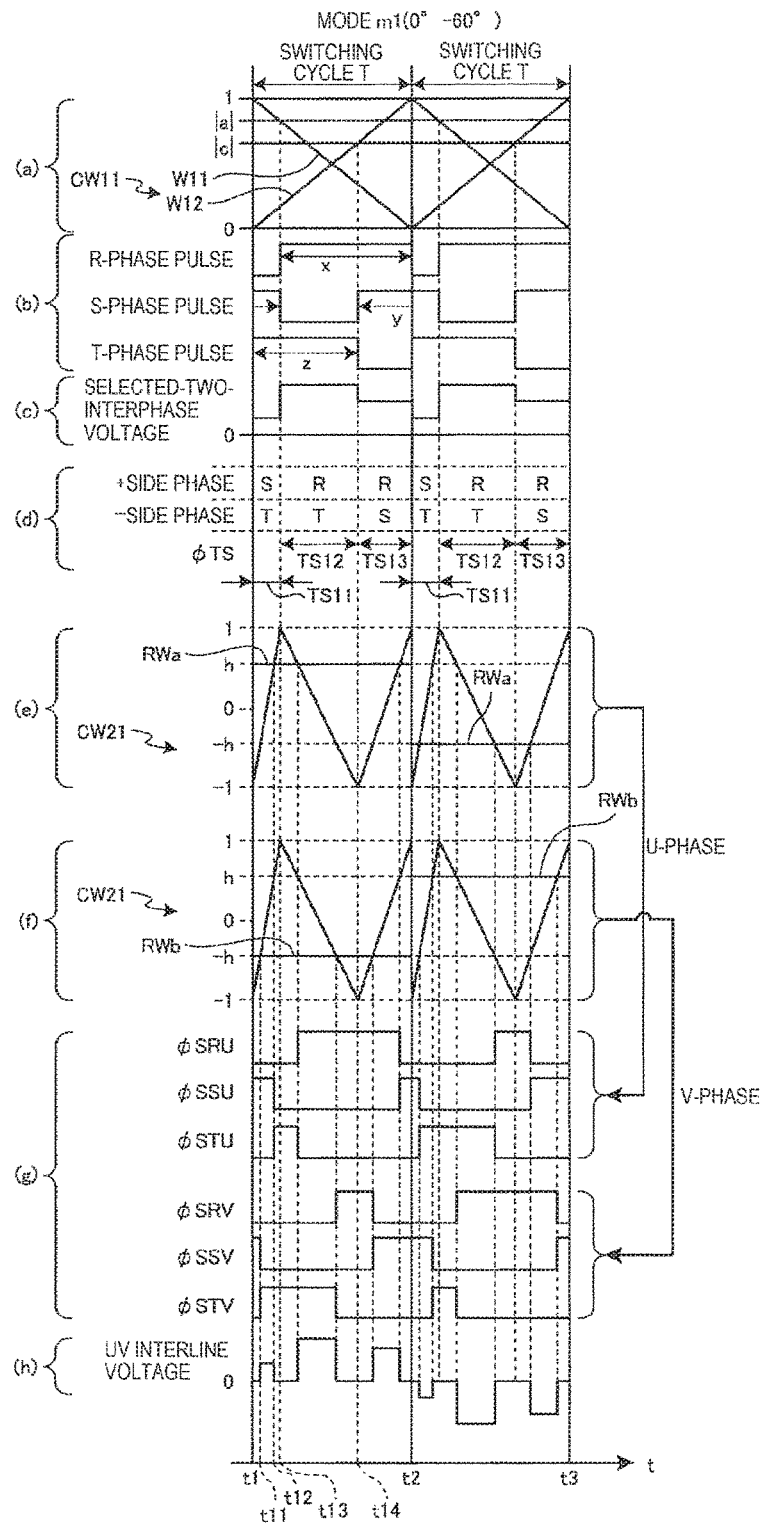

[Fig. 5]
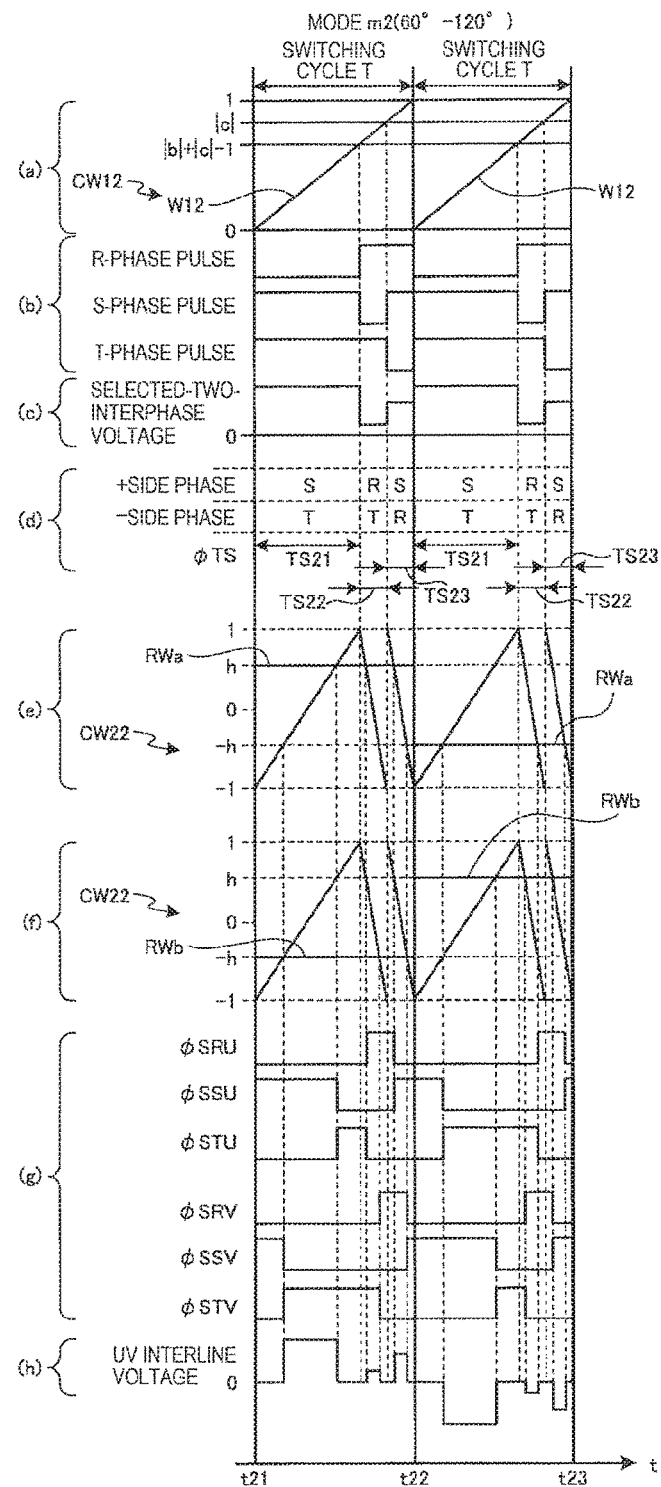

[Fig. 6]
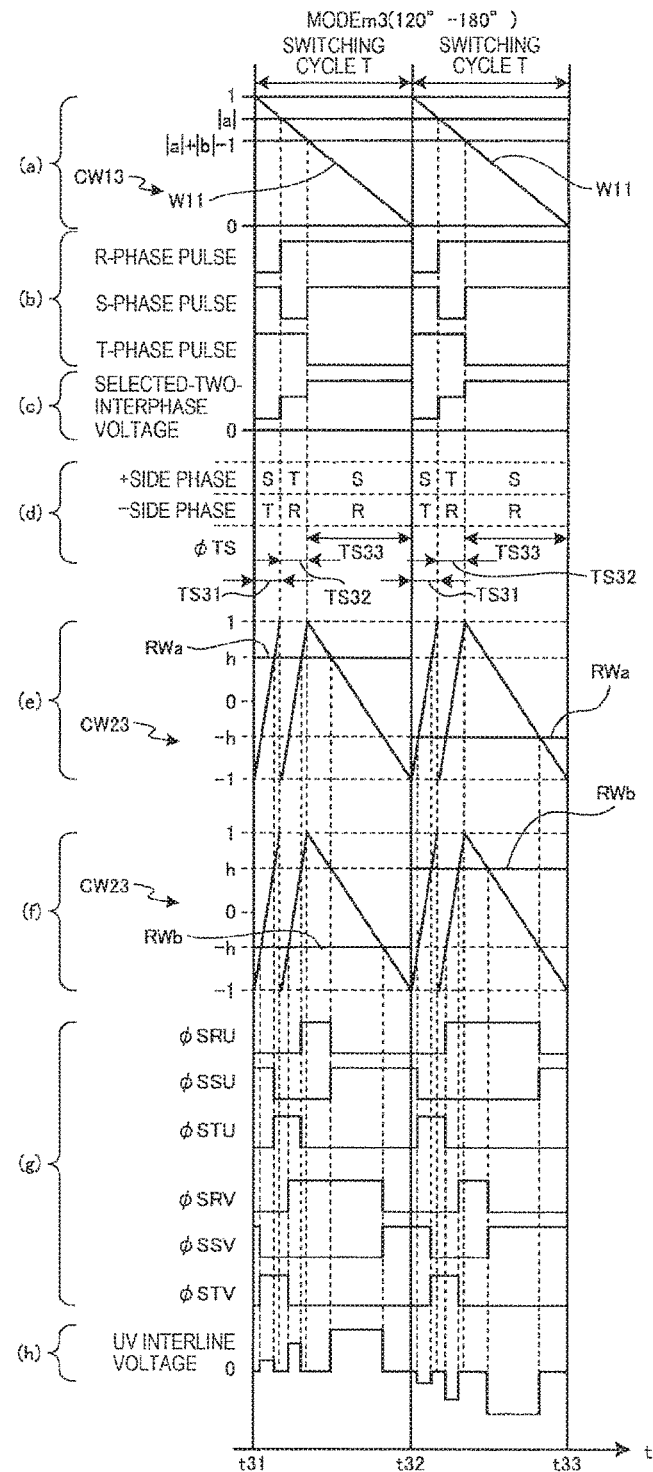

[Fig. 7]
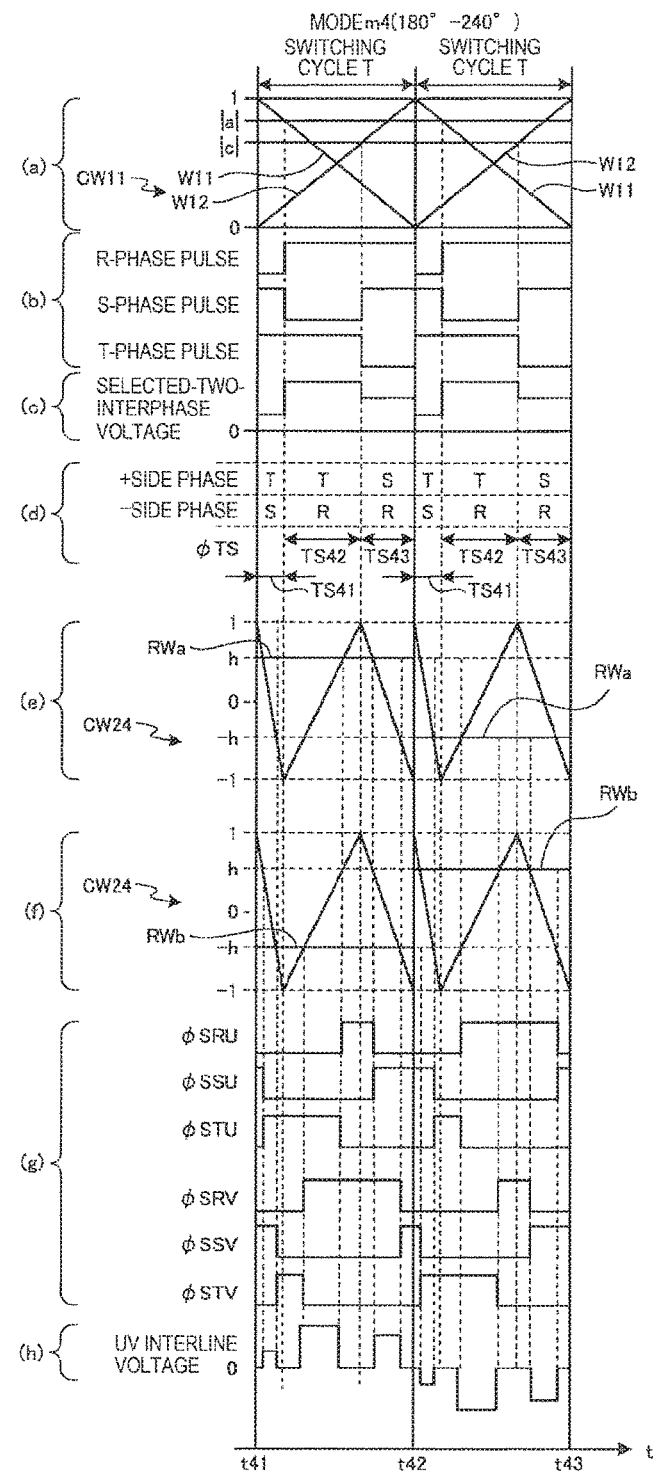

[Fig. 8]
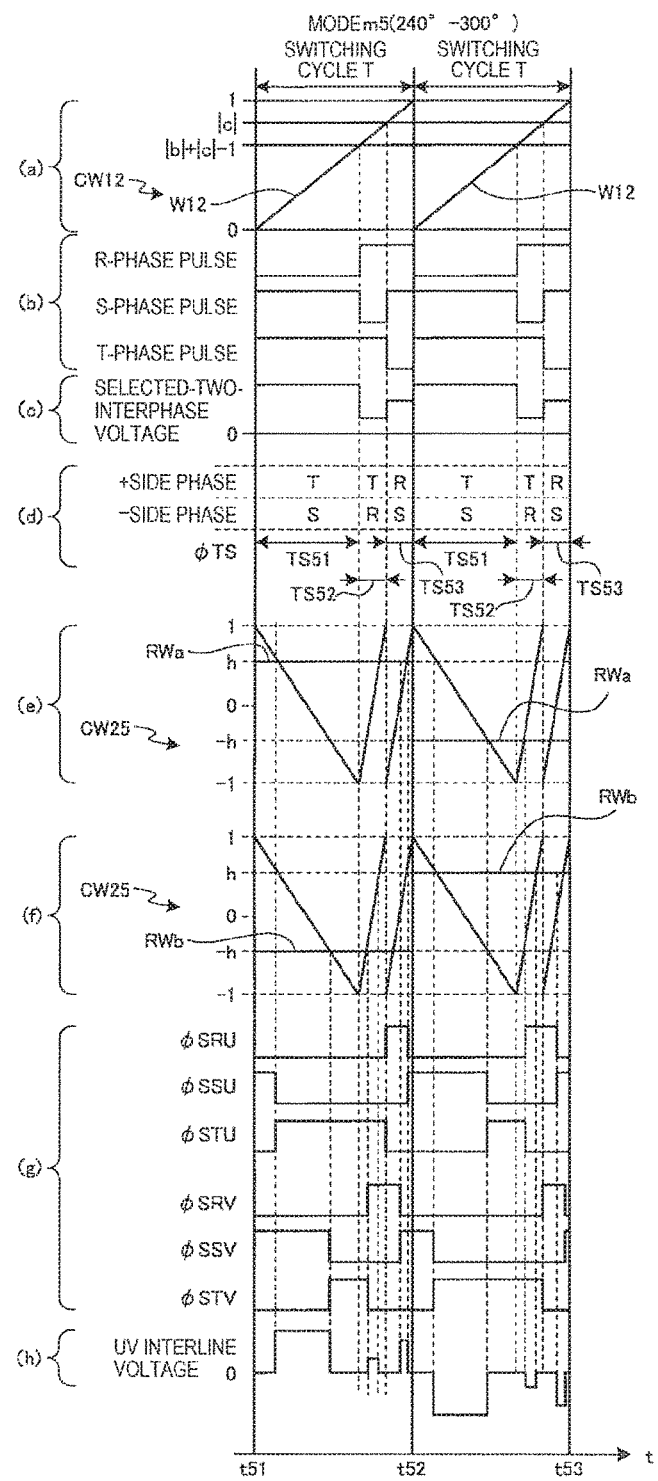

[Fig. 9]
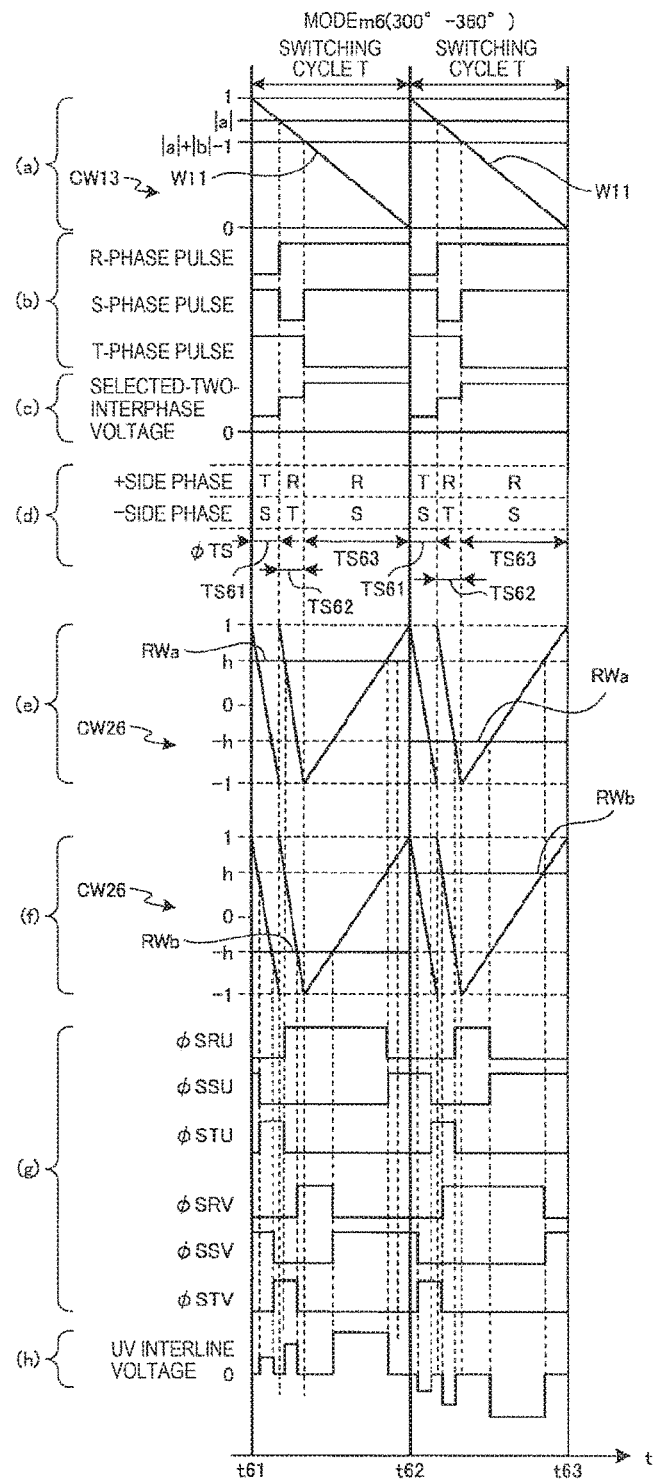

THREE-PHASE/SINGLE-PHASE MATRIX CONVERTER

RELATED APPLICATIONS

This application is the U.S. National Phase under 35 U.S.C. § 371 of International Application No. PCT/JP2016/059775, filed on Mar. 25, 2016, which in turn claims the benefit of Japanese Application No. 2015-067241, filed on Mar. 27, 2015, the disclosures of which are incorporated by reference herein.

TECHNICAL FIELD

The present invention relates to a three-phase/single-phase matrix converter capable of directly converting three-phase AC power into high-frequency single-phase AC power with high accuracy.

BACKGROUND ART

In the related art, a power converter which directly converts AC power into AC power without converting AC power to DC power is generally known as a matrix converter. In the matrix converter, a switching element which converts AC power into AC power is one stage. Accordingly, as compared with a power converter which combines a converter and an inverter, efficiency can be increased. Since there is no circuit which handles a DC voltage and there is no need for a smoothing capacitor, a life of a device can be prolonged and reliability can be enhanced.

On the other hand, Patent Document 1 describes an AC/DC power converter which converts three-phase AC power into single-phase AC power. The AC/DC power converter converts a three-phase AC voltage into a DC voltage by connecting a three-phase reactor and a diode rectifier to three-phase power supply, converts the converted DC voltage into a single-phase AC voltage by an inverter, and supplies the single-phase AC voltage to a coil which is a load. That is, in Patent Document 1, an AC voltage is generated after once converting an AC voltage to a DC voltage without using a matrix converter.

CITATION LIST

Patent Citation

Patent Document 1: Japanese Laid-open Patent Publication No. JP-A-2013-158064

SUMMARY OF INVENTION

Technical Problem

In Patent Document 1 described above, since a three-phase AC waveform is converted into a DC voltage using a rectifier, a smoothing circuit using a large capacity smoothing capacitor is requested so as o stably generate DC voltage by suppressing occurrence of ripples and the like. In addition, when the smoothing capacitor is used, since an input three-phase current waveform is distorted, it is necessary to further provide a large reactor on an input side. For this reason, a device is increased in size.

Here, it is conceivable to directly convert three-phase AC power into single-phase AC power by using the matrix converter. However, since the matrix converter performs switching using a plurality of bidirectional switches, for example, in recent years, it is not easy to accurately convert three-phase AC into a high-frequency single-phase AC signal in an 85 kHz bandwidth used for a contactless power supply coil to an electric vehicle. Particularly, if a single-phase AC signal becomes a high frequency, disturbance of commutation or a waveform is likely to occur.

An object of the present invention in view of the above is to provide a three-phase/single-phase matrix converter capable of directly converting three-phase AC power into high-frequency single-phase AC power with high accuracy.

Solution to Problem

In order to solve the above problems and achieve the object, according to the present invention there is provided a three-phase/single-phase matrix converter which directly converts input three-phase AC power into single-phase AC power and outputs the single-phase AC power to a load, the converter including: a bidirectional switch circuit which turns ON/OFF supply of the input three-phase AC power to the load; and a control unit which, for the input three-phase AC power, generates a first carrier waveform pattern having patterns different from each other for respective modes according to a plurality of modes classified according to a magnitude relationship between voltages of respective phases in the input three-phase AC power at a predetermined switching cycle, performs virtual AC/DC conversion processing in which a plurality of interline voltage generation sections selecting two phases among the input three-phase AC power are obtained from the first carrier waveform pattern and a first control signal corresponding to a phase of an input side within the predetermined switching cycle, generates second carrier waveform patterns different from each other for the plurality of modes corresponding to the plurality of interline voltage generation sections obtained by the virtual AC/DC conversion processing, and generates a switching pattern of the bidirectional switch circuit so as to perform different virtual DC/AC conversion processing according to the plurality of modes from the generated second carrier waveform pattern and a second control signal corresponding to a phase of an output side to interline voltages of the two phases selected in the plurality of interline voltage generation sections, in which the predetermined switching cycle is an integer fraction of half-cycle of a single-phase AC signal used for generating the single-phase AC power.

In the three-phase/single-phase matrix converter according to the present invention, the second control signal is a first square wave signal having a frequency of the single-phase AC signal and a second square wave signal reversed from the first square wave signal.

In the three-phase/single-phase matrix converter according to the present invention, the control unit recognizes a maximum voltage phase, a minimum voltage phase, and an intermediate voltage phase in the input three-phase AC power and divides the plurality of interline voltage generation sections into a first section corresponding to an intermediate voltage phase and a minimum voltage phase, a second section corresponding to a maximum voltage phase and a minimum voltage phase, and a third section corresponding to a maximum voltage phase and an intermediate voltage phase and obtains the plurality of interline voltage generation sections.

In the three-phase/single-phase matrix converter according to the present invention, the second carrier waveform pattern has a pattern in which a level changes to a mountain shape across two successive sections among the plurality of interline voltage generation sections.

In the three-phase single-phase matrix converter according to the present invention, when a voltage phase having a large voltage value is set as a +side phase and a voltage phase having a small voltage value is set as a −side phase among two voltage phases in each of the plurality of interline voltage generation sections, in a case where there is a phase common to the +side phase or the −side phase when the interline voltage generation section is switched, the second carrier waveform pattern has a pattern in which a level is continuous in a mountain shape across the two interline voltage generation sections to be switched and in a case where there is a phase reversed between the +side phase and the −side phase when the interline voltage generation section is switched, the second carrier waveform pattern has a pattern in which a level changes to a saw-tooth shape at a boundary between the two interline voltage generation sections to be switched.

Advantageous Effects of Invention

According to the present invention, a control unit, for the input three-phase AC power, generates first carrier waveform pattern having patterns different from each other for respective modes according to a plurality of modes classified according to a magnitude relationship between voltages of respective phases in the input three-phase AC power at a predetermined switching cycle, performs virtual AC/DC conversion processing in which a plurality of interline voltage generation sections selecting two phases among the input three-phase AC power are obtained from the first carrier waveform pattern and a first control signal corresponding to a phase of an input side within the predetermined switching cycle, generates second carrier waveform patterns different from each other for the plurality of modes corresponding to the plurality of interline voltage generation sections obtained by the virtual AC/DC conversion processing, and generates a switching pattern of the bidirectional switch circuit so as to perform different virtual DC/AC conversion processing according to the plurality of modes from the generated second carrier waveform pattern and a second control signal corresponding to a phase of an output side to interline voltages of the two phases selected in the plurality of interline voltage generation sections. Here, since the predetermined switching cycle is an integer fraction of half-cycle of a single-phase AC signal used for generating the single-phase AC power, disturbance of a waveform of an output single-phase AC signal is unlikely to occur and it is possible to directly convert input three-phase AC power into high-frequency single-phase AC power with high accuracy.

BRIEF DESCRIPTION OF DRAWINGS

FIG. 1 is a block diagram showing a configuration including a three-phase/single-phase matrix converter 1 according to an embodiment of the present invention.

FIG. 2 is a diagram showing an example of a configuration of a bidirectional switch shown in FIG. 1.

FIG. 3 is a diagram showing a plurality of modes recognized by a control unit shown in FIG. 1.

FIG. 4 is a time chart showing virtual AC/DC conversion processing and virtual DC/AC conversion processing in a mode m1 by the control unit shown in FIG. 1.

FIG. 5 is a time chart showing virtual AC/DC conversion processing and virtual DC/AC conversion processing in a mode m2 by the control unit shown in FIG. 1.

FIG. 6 is a time chart showing virtual AC/DC conversion processing and virtual DC/AC conversion processing in a mode m3 by the control unit shown in FIG. 1.

FIG. 7 is a time chart showing virtual AC/DC conversion processing and virtual DC/AC conversion processing in a mode m4 by the control unit shown in FIG. 1.

FIG. 8 is a time chart showing virtual AC/DC conversion processing and virtual DC/AC conversion processing in a mode m5 by the control unit shown in FIG. 1.

FIG. 9 is a time chart showing virtual AC/DC conversion processing and virtual DC/AC conversion processing in a mode m6 by the control unit shown in FIG. 1.

EMBODIMENTS FOR CARRYING OUT THE INVENTION

Hereinafter, embodiments for the present invention will be described with reference to accompanying drawings.
(Overall Configuration)

FIG. 1 is a block diagram showing a configuration including a three-phase/single-phase matrix converter 1 according to an embodiment of the present invention. As shown in FIG. 1, in the three-phase/single-phase matrix converter 1, three-phase AC power of R-phase, S-phase, and T-phase is respectively input from a three-phase AC power supply PS via power lines LR, LS, and LT, and the input three-phase AC power is directly converted into single-phase AC power without converting into DC power once and is output to a load LD via power lines LU and LV. Here, the single-phase AC power is power at which an interline voltage between U-phase of the power line LU and V-phase of the power line LV becomes AC. In addition, voltages and frequencies of three-phase AC power and single-phase AC power are respectively different from each other. For example, a frequency of three-phase AC power is 50 Hz and a frequency of single-phase AC power is a high frequency in an 85 kHz bandwidth. In addition, a single-phase AC signal is a square wave. The load LD is, for example, a single-phase coil for contactless power supply.

The three-phase/single-phase matrix converter 1 includes an input capacitor 40, a bidirectional switch circuit 10, and a control unit 20.

The input capacitor 40 includes capacitors 41 to 43. One end of each of the capacitors 41 to 43 is connected to the R-phase, the S-phase, and the T-phase, respectively, and the other end of each of the capacitors 41 to 43 is commonly connected. The input capacitor 40 reduces ripples of a current and a voltage of each of phases.

The bidirectional switch circuit 10 turns ON/OFF supply of the input three-phase AC power to the load LD so as to convert the input three-phase AC power into single-phase AC power. The bidirectional switch circuit 10 includes a bidirectional switch group SW. The bidirectional switch group SW includes six bidirectional switches SRU, SSU, STU, SRV, SSV, and STV. The bidirectional switch circuit 10 is controlled by the control unit 20 and converts the input three-phase AC power into single-phase AC power by respectively turning ON/OFF the six bidirectional switches SRU, SSU, STU, SRV, SSV, and STV at a predetermined timing. The bidirectional switches SRU, SSU, STU, SRV, SSV, and STV are closed and supply power to the load LD side at an ON state and are opened and do not supply power to the load LD side at an OFF state.

The bidirectional switch SRU turns ON/OFF a connection between R-phase and U-phase. The bidirectional switch SSU turns ON/OFF a connection between S-phase and U-phase. The bidirectional switch STU turns ON/OFF a connection between T-phase and U-phase. The bidirectional switch SRV turns ON/OFF a connection between R-phase and V-phase. The bidirectional switch SSV turns ON/OFF a connection between S-phase and V-phase. The bidirectional switch STV turns ON/OFF a connection between T-phase and V-phase.

Each of the bidirectional switches SRU, SSU, STU, SRV, SSV, and STV is equivalent to, for example, a switch S shown in FIG. 2(a). The switch S shown in FIG. 2(a) receives a switching signal from the control unit 20 via a control terminal CT, turns ON so as to connect with a terminal T1 and a terminal T2, and turns OFF so as to cut off the terminal T1 and the terminal T2. In the switch S, a current flows between the terminal T1 and the terminal T2 in a bidirection.

The switch S shown in FIG. 2(a) is an ideal switch. Since switching time exists in elements constituting an actual switch, the elements may be configured to be connected as shown FIGS. 2(b) and 2(c) considering an open mode and a short-circuit mode at the time of commutation. A configuration shown in FIG. 2(b) is a configuration realized, for example, by connecting elements EL 1 and EL 2 in parallel having a reverse current blocking function. The elements EL1 and EL2 having the reverse current blocking function may be, for example, an insulated-gate bipolar transistor (IGBT). Terminals T1' and T2' respectively correspond to the terminals T1 and T2 shown in FIG. 2(a) and control terminals CT1' and CT2' correspond to the control terminal CT shown in FIG. 2(a).

Alternatively, a configuration shown in FIG. 2(c) is a configuration realized, for example, by connecting elements EL 11 and EL 12 in series not having a reverse current blocking function. The elements EL 11 and EL 12 not having the reverse current blocking function may be, for example, an insulated-gate bipolar transistor (IGBT) having freewheeling diodes connected to both ends thereof or a field-effect transistor (FET). The terminal T1" corresponds to the terminal T1 shown in FIG. 2(a). The terminal T2" corresponds to the terminal T2 shown in FIG. 2(a). Control terminals CT1" and CT2" correspond to the control terminal CT shown in FIG. 2(a).

(Overview of Processing by Control Unit)

The control unit 20 generates a switching pattern of the bidirectional switch group SW in the bidirectional switch circuit 10. The control unit 20 generates a switching pattern (that is, a pattern of a switching signal) of the bidirectional switch circuit 10 so as to perform virtual AC/DC conversion processing to three-phase AC power input to the bidirectional switch circuit 10 and to perform virtual DC/AC conversion processing to the power to which the virtual AC/DC conversion processing is performed. In the following, "performing virtual AC/DC conversion processing" means to perform virtual AC/DC conversion processing virtually and "performing virtual DC/AC conversion processing" means to perform virtual DC/AC conversion processing virtually.

The control unit 20 generates a switching pattern of the bidirectional switch circuit 10 for the input three-phase AC power so as to perform virtual AC/DC conversion processing different from each other for a plurality of modes (for example, modes m1 to m6 shown in FIG. 3) classified according to a magnitude relationship between voltages of respective phases in the input three-phase AC power. Here, the mode m1 is a phase section of 0° to 60° assuming that a point at which an R-phase voltage is a maximum value (or at which an S-phase voltage and a T-phase voltage cross each other) is a start point (0°). In the same manner, the modes m2 to m6 are respectively phase sections of 60° to 120°, 120° to 180°, 180° to 240°, 240° to 300°, and 300° to 360°.

The control unit 20 includes a synchronization signal detection unit 21. The synchronization signal detection unit 21 detects an intersection point at which a voltage difference between S-phase and T-phase becomes "0", estimates an AC voltage of each of phases (R-phase, S-phase, and T-phase) of an input side as a first control signal by setting this intersection point phase to 0°, and recognizes which mode in the plurality of modes m1 to m6 is a mode at that time in accordance with a magnitude relationship of the estimated AC voltage of each of the phases.

The control unit 20 includes a first carrier waveform pattern generating unit 22. The first carrier waveform pattern generating unit 22 repeatedly generates first carrier waveform patterns different from each other for the plurality of modes m1 to m6, for example, first carrier waveform patterns CW11 to CW13 shown in FIGS. 4 to 9 for the input three-phase AC power at every switching cycle T. That is, the first carrier waveform pattern generating unit 22 determines the first carrier waveform patterns CW11 to CW13 to be used for virtual AC/DC conversion processing according to the modes m1 to m6 recognized by the synchronization signal detection unit 21 at every switching cycle T.

The control unit 20 includes a phase information generating unit 23. As shown in FIG. 4(a), the phase information generating unit 23 compares the first carrier waveform patterns CW11 to CW13 determined by the first carrier waveform pattern generating unit 22 with the first control signal corresponding to a phase of an input side and generates a plurality of virtual switching signals (R-phase pulse, S-phase pulse, and T-phase pulse) for each of the bidirectional switches SRU to STV so as to virtually generate DC power according to a comparison result. With this, the phase information generating unit 23 obtains a plurality of interline voltage generation sections ɸTS (for example, sections TS11, TS12, and TS13 in the mode m1 shown in FIG. 4(d)) according to a combination of levels (High and Low) of the plurality of virtual switching signals (R-phase pulse, S-phase pulse, and T-phase pulse). In addition, the phase information generating unit 23 obtains a selected +side phase and −side phase in the interline voltage generation section ɸTS. The phase information generating unit 23 obtains the plurality of interline voltage generation sections ɸTS so that averages of the selected-two-interphase voltages within the switching cycle T obtained in each of the modes m1 to m6 are equal to each other. In other words, as described below, the phase information generating unit 23 virtually performs AC/DC conversion processing (virtual AC/DC conversion processing) to each of the bidirectional switches SRU to STV so that each of the bidirectional switches SRU to STV performs a virtual switching operation for generating DC power.

Although the virtual switching operation is a switching operation different from an operation actually performed by each of the bidirectional switches SRU to STV, the virtual switching operation is regarded as a switching operation virtually performed by each of the bidirectional switches SRU to STV so as to consider generating virtual DC power in an intermediate stage of virtual AC/DC conversion to virtual DC/AC conversion. A virtual process of generating the virtual DC power in the intermediate stage is completely virtual, and the process itself is not actually performed.

In addition, the control unit 20 controls a switching pattern (that is, a pattern of a switching signal) of the bidirectional switch circuit 10 so as to perform virtual DC/AC conversion processing different from each other for the plurality of modes m1 to m6 to power to which virtual AC/DC conversion processing is performed.

Specifically, the control unit 20 includes a second carrier waveform pattern generating unit 24. The second carrier waveform pattern generating unit 24 generates second carrier waveform patterns (for example, second carrier waveform patterns CW21 to CW26 shown in FIGS. 4 to 9) different from each other for the plurality of modes m1 to m6 recognized by the synchronization signal detection unit 21. The control unit 20 controls the bidirectional switch circuit 10 so as to perform virtual DC/AC conversion processing using the second carrier waveform patterns CW21 to CW26. That is, the control unit 20 generates the second carrier waveform patterns CW21 to CW26 corresponding to the plurality of interline voltage generation sections φTS used for virtual DC/AC conversion processing according to the recognized modes m1 to m6. When the second carrier waveform patterns CW21 to CW26 are within the same mode, the second carrier waveform patterns CW21 to CW26 are also generated repeatedly at every switching cycle T. At this time, the plurality of interline voltage generation sections φTS corresponds to a combination of levels of the plurality of virtual switching signals. That is, the control unit 20 generates the second carrier waveform patterns CW21 to CW26 according to the recognized mode and the combination of the levels of the plurality of switching signals so that each of the bidirectional switches SRU to STV virtually generates DC power.

Here, the control unit 20 generates a second control signal which is a U-phase control signal RWa or a V-phase control signal RWb reversed from the U-phase control signal RWa. For this reason, a square wave signal generating unit 25 generates a single-phase AC signal RW of a square wave in a high frequency, for example, an 85 kHz bandwidth in synchronization with the modes m1 to m6 detected by the synchronization signal detection unit 21. The switching cycle T described above is ½ of a cycle of the single-phase AC signal RW. In addition, in a case where a frequency of the single-phase AC signal RW is low, the switching cycle T may be set to be an integer fraction of half-cycle of the single-phase AC signal RW. Further, the switching cycle T is a cycle larger than a cycle of a switching frequency limit of the bidirectional switch group SW. It is preferable that the switching cycle T is a short cycle. By setting the short switching cycle T, energy accumulation at the time of conversion approaches zero.

On the other hand, a voltage setting unit 50 inputs a voltage amplitude value Vh of a single-phase AC signal of a square wave to be applied to the load LD to a voltage regulator 53 as a voltage command. A full-wave rectifier 51 obtains a U-phase voltage and a V-phase voltage of a single-phase AC signal connected and output to the power lines LU and LV, rectifies a full-wave, and outputs the U-phase voltage and the V-phase voltage to a filter circuit 52. The filter circuit 52 performs smoothing and noise removal and outputs a voltage amplitude value V1 of the full-wave rectified single-phase AC signal to the voltage regulator 53. The voltage regulator 53 is, for example, a PI control unit and outputs a voltage control signal Vref corresponding to a deviation between the voltage amplitude value V1 fed back and the voltage amplitude value Vh to a multiplier 26. The single-phase AC signal RW is input from the square wave signal generating unit 25 to the multiplier 26. By multiplying the single-phase AC signal RW by the voltage control signal Vref, the multiplier 26 generates the U-phase control signal RWa which adjusts so that a voltage amplitude value supplied to the load LD approaches to the voltage amplitude value Vh.

The U-phase control signal RWa is input to −side of a U-phase comparator CU. In addition, an inverter 27 reverses the U-phase control signal RWa and inputs the reversed signal to −side of a V-phase comparator CV as the V-phase control signal RWb. A second carrier waveform pattern CW2 (CW21 to CW26) generated by the second carrier waveform pattern generating unit 24 is input to each of +sides of the U-phase comparator CU and the V-phase comparator CV.

The U-phase comparator CU compares the U-phase control signal RWa with the second carrier waveform pattern CW2 and outputs a comparison result to a switch control unit 28. On the other hand, the V-phase comparator CV compares the V-phase control signal RWb with the second carrier waveform pattern CW2 and outputs a comparison result to the switch control unit 28. Based on the comparison result of the U-phase comparator CU, the switch control unit 28 PWM-controls the selected-two-interphase voltages obtained by R-phase pulse, S-phase pulse, and T-phase pulse of the interline voltage generation section φTS and generates switching signals φSRU, φSSU, and φSTU which switch the bidirectional switches SRU, SSU, and STU connected to U-phase. In addition, based on the comparison result of the V-phase comparator CV, the switch control unit 28 PWM-controls the selected-two-interphase voltages of the interline voltage generation section φTS and generates switching signals φSRV, φSSV, and φSTV which switch the bidirectional switches SRV, SSV, and STV connected to V-phase. A UV interline voltage is supplied to the load ID as a single-phase AC signal of a rectangular wave alternating with a desired voltage amplitude value at every switching cycle T. In other the control unit 20 virtually performs DC/AC conversion processing (virtual DC/AC conversion processing) to each of the bidirectional switches SRU to STV.

(Description of Mode)

Here, the plurality of modes m1 to m6 recognized by the synchronization signal detection unit 21 will be described with reference to FIG. 3.

The synchronization signal detection unit 21 recognizes the six modes m1 to m6 shown in FIG. 3 according to a magnitude relationship of respective AC voltages of detected phases (R-phase, S-phase, and T-phase).

In the mode m1, R-phase is a maximum voltage phase, T-phase is a minimum voltage phase, and S-phase is an intermediate voltage phase. For example, when recognizing that R-phase is a maximum voltage phase, T-phase is a minimum voltage phase, and S-phase is an intermediate voltage phase, the synchronization signal detection unit 21 recognizes that a current mode is the mode m1.

In the mode m2, S-phase is a maximum voltage phase, T-phase is a minimum voltage phase, and R-phase is an intermediate voltage phase. For example, when recognizing that S-phase is a maximum voltage phase, T-phase is a minimum voltage phase, and R-phase is an intermediate voltage phase, the synchronization signal detection unit 21 recognizes that a current mode is the mode m2.

In the mode m3, S-phase is a maximum voltage phase, R-phase is a minimum voltage phase, and T-phase is an intermediate voltage phase. For example, when recognizing that S-phase is a maximum voltage phase, R-phase is a minimum voltage phase, and T-phase is an intermediate voltage phase, the synchronization signal detection unit 21 recognizes that a current mode is the mode m3.

In the mode m4, T-phase is a maximum voltage phase, R-phase is a minimum voltage phase, and S-phase is an intermediate voltage phase. For example, when recognizing that T-phase is a maximum voltage phase, R-phase is a minimum voltage phase, and S-phase is an intermediate voltage phase, the synchronization signal detection unit 21 recognizes that a current mode is the mode m4.

In the mode m5, T-phase is a maximum voltage phase, S-phase is a minimum voltage phase, and R-phase is an intermediate voltage phase. For example, when recognizing that T-phase is a maximum voltage phase, S-phase is a minimum voltage phase, and R-phase is an intermediate voltage phase, the synchronization signal detection unit 21 recognizes that a current mode is the mode m5.

In the mode m6, R-phase is a maximum voltage phase, S-phase is a minimum voltage phase, and T-phase is an intermediate voltage phase. For example, when recognizing that R-phase is a maximum voltage phase, S-phase is a minimum voltage phase, and T-phase is an intermediate voltage phase, the synchronization signal detection unit 21 recognizes that a current mode is the mode m6.

The synchronization signal detection unit 21 may recognize each of the modes m1 to m6 by setting a start point (a point at which a detection voltage of R-phase is maximum) of the mode m1 as a base.

In addition, as shown in a lower part of FIG. 3, a single-phase AC voltage supplied to the load LD is a square wave signal with a high frequency whose one half-cycle corresponds to the switching cycle T.

(Specific Virtual AC/DC Conversion Processing)

Next, virtual AC/DC conversion processing in each of the plurality of modes m1 to m6 will be described with reference to FIGS. 4 to 9. FIGS. 4 to 9 show two successive switching cycles T within each of the modes m1 to m6. In the following description, a case where a DC voltage setting gain determined according to a DC voltage setting value (virtual DC voltage as a conversion target) is 1 will be described as an example for simplicity of description.

[Mode m1]

As shown in FIG. 4(a), in the mode m1, the first carrier waveform pattern generating unit 22 determines the first carrier waveform pattern CW11 including a descending saw-tooth wave W11 and an ascending saw-tooth wave W12 as a first carrier waveform pattern CW1 to be used for virtual AC/DC conversion processing. "descending saw-tooth wave" refers to a saw-tooth wave having a negative slope in which an amplitude linearly decreases as time passes and "ascending saw-tooth wave" refers to a saw-tooth wave having a positive slope in which the amplitude linearly increases as time passes.

On the other hand, an R-phase voltage a, an S-phase voltage b, and a T-phase voltage c directly detected by the synchronization signal detection unit 21 are input to the phase information generating unit 23. Alternatively, the phase information generating unit 23 estimates the R-phase voltage a, the S-phase voltage b, and the T-phase voltage c by setting a start point (a point at which a detection voltage of R-phase is maximum) of the mode m1 as a base. The R-phase voltage a, the S-phase voltage b, and the T-phase voltage c are obtained for each of the switching cycles T and change as the switching cycle T passes. In FIG. 4, a case where the R-phase voltage a, the S-phase voltage b, and the T-phase voltage c are in the adjacent switching cycles T is shown. Here, the R-phase voltage a, the S-phase voltage b, and the T-phase voltage c input or estimated are respectively standardized voltages between "−1" and "1". At this time, DC voltages of the sections (interline voltage generation sections) TS11, TS12, and TS13 shown in FIG. 4(d) are respectively an ST voltage=b−c, an RT voltage=a−c, and an RS voltage=a−b.

A pulse of each of phases in the mode m1 will be described with reference to FIGS. 4(a) and 4(b). In the mode m1, R-phase is a maximum voltage phase, T-phase is a minimum voltage phase, and S-phase is an intermediate voltage phase. In a maximum voltage phase and a minimum voltage phase, pulses are ON for times proportional to respective potentials. Thus, a pulse width x of R-phase=T|a| and a pulse width z of T-phase=T|c|. Here, a timing at which R-phase pulse turns ON (a timing at which the section TS11 ends) is obtained from an intersection point of an R-phase voltage |a| and the saw-tooth wave W11. R-phase pulse turns ON when the R-phase voltage |a| is equal to or more than a value of the saw-tooth wave W11. Accordingly, R-phase pulse is obtained. A timing at which T-phase pulse turns OFF (a timing at which the section TS12 ends after the section TS11) is obtained from an intersection point of a T-phase voltage |c| and the saw-tooth wave W12. T-phase pulse turns ON when the T-phase voltage |c| is equal to or more than a value of the saw-tooth wave W12. Accordingly, T-phase pulse is obtained. An intermediate phase pulse turns ON when one of pulses of a maximum voltage phase or a minimum voltage phase is OFF. Thus, S-phase pulse is obtained from the intersection point of the R-phase voltage |a| and the saw-tooth wave W11 and the intersection point of the T-phase voltage |c| and the saw-tooth wave W12.

Here, widths of the interline voltage generation sections TS11, TS12, and TS13 are respectively T×(1−|a|), T×(|a|+|c|−1), and T×(1−|c|). That is, in virtual AC/DC conversion processing, the plurality of virtual switching signals (R-phase pulse, S-phase pulse, and T-phase pulse) respectively having widths corresponding to the interline voltage generation sections TS11, TS12, and TS13 are generated so as to generate a virtual DC voltage.

In addition, DC voltages (the selected-two-interphase voltages shown in FIG. 4(c)) of the interline voltage generation sections TS11, TS12, and TS13 in the virtual AC/DC conversion processing are respectively an ST voltage=b−c, an RT voltage=a−c, and an RS voltage=a−b. Assuming that a voltage phase having a larger level is a +side phase and a voltage phase having a lower level is a −side phase among two voltage phases in the selected-two-interphase voltages, S-phase, R-phase, and R-phase are +side phases and T-phase, T-phase, and S-phase are −side phases in the interline voltage generation sections TS11, TS12, and TS13. The phase information generating unit 23 momently outputs the interline voltage generation section ϕTS (TS11, TS12, and TS13) to the second carrier waveform pattern generating unit 24 and the switch control unit 28 and momently outputs the +side phases and the −side phases to the switch control unit 28.

However, an average of DC voltages of the switching cycle T is calculated by integrating the DC voltages for each of the interline voltage generation sections TS11, TS12, and TS13, adding the DC voltages, and dividing by the switching cycle T and can be represented in the following Equation (1).

average DC voltages of switching cycle $T = \{(b-c) \times T \times (1-a) + (a-c) \times T \times (a-c-1) + (a-b) \times T \times (1+c)\}/T = a^2 + c^2 - b(a+c)$     (1)

Here, considering a+b+c=0 (three-phase condition), Equation (1) can be transformed into the following Equation (2).

$$\text{average of DC voltages of switching cycle } T = a^2 + b^2 + c^2 \quad (2)$$

Further, from an AC theory, Equation (2) can be transformed into the following Equation (3) by $a^2+b^2+c^2=3/2$.

$$\text{average of DC voltages of switching cycle } T = 3/2 \quad (3)$$

As represented in Equation (3), the average of virtual DC voltages the switching cycle T can be a constant voltage.

An input current in the mode m1 will be described. An input current of R-phase is a positive current proportional to a time of the R-phase voltage a. An input current of T-phase is a negative current proportional to the T-phase voltage |c|. An input current of S-phase is a positive current in the interline voltage generation section TS11 and is a negative current in the interline voltage generation section TS13. Thus, a flowing current is T×(1−a)−T×(1+c)−T(−a−c)=Tb and becomes the S-phase voltage b when divided by the switching cycle T. Thus, currents proportional to the R-phase voltage a, the S-phase voltage b, and the T-phase voltage c respectively flow in R-phase, S-phase, and T-phase, so that each of phases of input AC currents can be a sinusoidal wave.

[Mode m2]

As shown in FIG. 5(a), in the mode m2, the first carrier waveform pattern generating unit 22 determines the first carrier waveform pattern CW12 including an ascending saw-tooth wave W12 as the first carrier waveform pattern CW1 to be used for virtual AC/DC conversion processing. The phase information generating unit 23 obtains or estimates the R-phase voltage a, the S-phase voltage b, and the T-phase voltage c according to a detection result of the synchronization signal detection unit 21. At this time, DC voltages of interline voltage generation sections TS21, TS22, and TS23 shown in FIG. 5(d) are respectively an ST voltage=b−c, an PT voltage=a−c, and an RS voltage=b−a.

A pulse of each of phases in the mode m2 will be described with reference to FIGS. 5(a) and 5(b). In the mode m2, S-phase is a maximum voltage phase, T-phase is a minimum voltage phase, and R-phase is an intermediate voltage phase. In order to turn ON a time proportional to a potential of each in a maximum voltage phase and a minimum voltage phase without changing ON/OFF order of pulses of R-, S-, and T-phases, the phase information generating unit 23 generates ON/OFF timing of each of phase pulses shown in FIG. 5(b) the mode m2 using the T-phase voltage |c|, a voltage (|b|+|c|−1), and the saw-tooth wave W12.

Here, widths of the interline voltage generation sections TS21, TS22, and TS23 are respectively T×(|b|+|c|−1), T×(1−|b|), and T×(1−|c|). That is, in virtual AC/DC conversion processing, the plurality of virtual switching signals (R-phase pulse, S-phase pulse, and T-phase pulse) respectively having widths corresponding to the interline voltage generation sections TS21, TS22, and TS23 are generated so as to generate a virtual DC voltage.

Here, DC voltages (the selected-two-interphase voltages shown in FIG. 5(c)) of the interline voltage generation sections TS21, TS22, and TS23 in the virtual AC/DC conversion processing are respectively an ST voltage=b−c, an RT voltage=a−c, and an SR voltage=b−a. Assuming that a voltage phase having a larger level is a +side phase and a voltage phase having a lower level is a −side phase among two voltage phases in the selected-two-interphase voltages, S-phase, R-phase, and S-phase are +side phases and T-phase, T-phase, and R-phase are −side phases in the interline voltage generation sections TS21, TS22, and TS23. The phase information generating unit 23 momently outputs the interline voltage generation section φTS (TS21, TS22, and TS23) to the second carrier waveform pattern generating unit 24 and the switch control unit 28 and momently outputs the +side phases and the −side phases to the switch control unit 28.

However, an average of DC voltages of a switching cycle T in the mode m2 can be represented in the following Equation (4).

$$\text{average of DC voltages of switching cycle } T = \{(b-c) \times T \times (-c+b-1) + (a-c) \times T \times (-b+1) + (b-a) \times T \times (1+c)\}/T = b^2 + c^2 - a(b+c) \quad (4)$$

Here, considering a+b+c=0 (three-phase condition), Equation (4) can be transformed into the following Equation (5).

$$\text{average of DC voltages of switching cycle } T = a^2 + b^2 + c^2 \quad (5)$$

Further, from an AC theory, Equation (5) can be transformed into the following Equation (6) by $a^2+b^2+c^2=3/2$.

$$\text{average of DC voltages of switching cycle } T = 3/2 \quad (6)$$

As represented in Equation (6), the average of virtual DC voltages of the switching cycle T can be a constant voltage.

An input current in the mode m2 will be described. Since S-phase is a maximum voltage phase and T-phase is a minimum voltage phase in the mode m2, a positive current proportional to a time of the S-phase voltage b flows in S-phase and a negative current proportional to a time of the T-phase voltage c flows in T-phase. A negative current flows in the interline voltage generation section TS22 of R-phase and a positive current flows in the interline voltage generation section TS23 of R-phase. For this reason, a flowing current is T×(1−b)−T×(1+c)=Ta and becomes the R-phase voltage a when divided by the switching cycle T. Accordingly, a current proportional to a voltage flows in each of phases, so that each of phases of input AC currents can be a sinusoidal wave.

[Mode m3]

As shown in FIG. 6(a), in the mode m3, the first carrier waveform pattern generating unit 22 determines the first carrier waveform pattern CW13 including a descending saw-tooth wave W11 as a first carrier waveform pattern to be used for virtual AC/DC conversion processing. The phase information generating unit 23 obtains or estimates the R-phase voltage a, the S-phase voltage b, and the T-phase voltage c according to a detection result of the synchronization signal detection unit 21. At this time, DC voltages of interline voltage generation sections TS31, TS32, and TS33 shown in FIG. 6(d) are respectively an ST voltage=c−b, an RT voltage=a−c, and an RS voltage=a−b.

A pulse of each of phases in the mode m3 will be described with reference to FIGS. 6(a) and 6(b). In the mode m3, S-phase maximum voltage phase, R-phase is a minimum voltage phase, and T-phase is an intermediate voltage phase. In order to turn ON a time proportional to a potential of each in a maximum voltage phase and a minimum voltage phase without changing ON/OFF order of pulses of R-, S-, and T-phases, ON/OFF timing of each of pulses shown in FIG. 6(b) is generated in the mode m3 using the R-phase voltage |a|, a voltage (|a|+|b|−1), and the saw-tooth wave W11.

Here, widths of the interline voltage generation sections TS31, TS32, and TS33 are respectively T×(1−|a|), T(1−|b|), and T×(|a|+|b|−1). That is, in virtual AC/DC conversion processing, the plurality of virtual switching signals (R-phase pulse, S-phase pulse, and T-phase pulse) respectively having widths corresponding to the interline voltage generation sections TS31, TS32, and TS33 are generated so as to generate a virtual DC voltage.

Here, DC voltages (the selected-two-interphase voltages shown in FIG. 6(c)) of the interline voltage generation sections TS31, TS32, and TS33 in the virtual AC/DC conversion processing are respectively an ST voltage=b−c, a TR voltage=c−a, and an SR voltage=b−a. Assuming that a voltage phase having a larger level is a +side phase and a voltage phase having a lower level is a −side phase among two voltage phases in the selected-two-interphase voltages, S-phase, T-phase, and S-phase are +side phases and T-phase, R-phase, and R-phase are −side phases in the interline voltage generation sections TS31, TS32, and TS33. The phase information generating unit 23 momently outputs the interline voltage generation section φTS (TS31, TS32, and TS33) to the second carrier waveform pattern generating unit 24 and the switch control unit 28 and momently outputs the +side phases and the −side phases to the switch control unit 28.

However, an average of DC voltages of a switching cycle T in the mode m3 can be represented in the following Equation (7).

average of DC voltages of switching cycle $T=\{(c-b) \times T \times (1-a)+(a-c) \times T \times (b+1)+(a-b) \times T \times (a-b-1)\}/T=a^2+b^2-c(a+b)$ (7)

Here, considering a+b+c=0 (three-phase condition), Equation (7) can be transformed into the following Equation (8).

average of DC voltages of switching cycle $T=a^2+b^2+c^2$ (8)

Further, from an AC theory, Equation (8) can be transformed into the following Equation (9) by $a^2+b^2+c^2=3/2$.

average of DC voltages of switching cycle $T=3/2$ (9)

As represented in Equation (9), the average of virtual DC voltages of the switching cycle T can be a constant voltage.

An input current in the mode m3 will be described. A positive current proportional to a time of the S-phase voltage b flows in S-phase of a maximum voltage phase. A negative current proportional to a time of the R-phase voltage a flows in R-phase of a minimum voltage phase. A negative current flows in the interline voltage generation section TS31 of T-phase and a positive current flows in the interline voltage generation section TS32 of T-phase. For this reason, a flowing current is T×(1−a)−T×(1+b)=Tc and becomes the T-phase voltage c when divided by the switching cycle T. Accordingly, a current proportional to a voltage flows in each of phases, so that each of phases of input AC currents can be a sinusoidal wave.

[Modes m4 to m6]

As shown in FIG. 7, virtual AC/DC conversion processing in the mode m4 is the same as virtual AC/DC conversion processing in the mode m1 (see FIG. 4). Interline voltage generation sections TS41, TS42, and TS43 are obtained in the same manner as the mode m1. T-phase, T-phase, and S-phase are +side phases and S-phase, R-phase, and R-phase are −side phases in the interline voltage generation sections TS41, TS42, and TS43.

As shown in FIG. 8, virtual AC/DC conversion processing in the mode m5 is the same as virtual AC/DC conversion processing in the mode m2 (see FIG. 5). Interline voltage generation sections TS51, TS52, and TS53 are obtained in the same manner as the mode m2. T-phase, T-phase, and R-phase are +side phases and S-phase, R-phase, and S-phase are −side phases in the interline voltage generation sections TS51, TS52, and TS53.

As shown in FIG. 9, virtual AC/DC conversion processing in the mode m6 is the same as virtual AC/DC conversion processing in the mode m3 (see FIG. 6). Interline voltage generation sections TS61, TS62, and TS63 are obtained in the same manner as the mode m3. T-phase, R-phase, and R-phase are +side phases and S-phase, T-phase, and S-phase are −side phases in the interline voltage generation sections TS61, TS62, and TS63.

(Specific Virtual DC/AC Conversion Processing)

Next, virtual DC/AC conversion processing in each of the plurality of modes m1 to m6 will be described with reference to FIGS. 4 to 9. First, as shown in FIGS. 4(e) and 4(f) to 9(e) and 9(f), the second carrier waveform pattern generating unit 24 generates the second carrier waveform pattern CW2 (CW21 to CW26) corresponding to the modes m1 to m6. The second carrier waveform pattern CW2 is determined so as to have a pattern in which a level changes to a mountain shape across two successive interline voltage generation sections among the plurality of interline voltage generation sections φTS. In addition, in a case where there is a phase common to a +side phase or a −side phase when the plurality of interline voltage generation sections φTS are switched, the second carrier waveform pattern CW2 has a pattern in which a level is continuous in a mountain shape across two interline voltage generation sections to be switched. In a case where there is a phase reversed between a +side phase and a −side phase when the plurality of interline voltage generation sections φTS are switched, the second carrier waveform pattern CW2 is determined so as to have a pattern in which a level changes to a saw-tooth shape at a boundary between two interline voltage generation sections φTS to be switched.

[Mode m1]

As shown in FIGS. 4(e) and 4(f), in the mode m1, the second carrier waveform pattern generating unit 24 determines the second carrier waveform pattern CW21 including an ascending saw-tooth wave, a descending saw-tooth wave, and an ascending saw-tooth wave in order of the interline voltage generation sections TS11, TS12, and TS13 as the second carrier waveform pattern CW2 to be used for virtual DC/AC conversion processing.

[Switching of Bidirectional Switches SRU, SSU, and STU]

The U-phase comparator CU compares the second carrier waveform pattern CW21 with the U-phase control signal RWa. Based on the comparison result of the U-phase comparator CU, the switch control unit 28 controls switching of bidirectional switches SRU, SSU, and STU connected to U-phase. The switching of the bidirectional switches SRU, SSU, and STU is respectively equivalent to PWM-control of R-phase pulse, S-phase pulse, and T-phase pulse with respect to a U-phase voltage. As shown in FIG. 4(e), in the interline voltage generation section TS11, according to the comparison result of the U-phase comparator CU, the switch control unit 28 selects a +side phase, that is, S-phase between time points t1 to t12 during which the U-phase control signal RWa is larger than the second carrier waveform pattern CW21 and sets the switching signal φSSU to an ON level and sets the other switching signals φSRU and φSTU connected to U-phase to an OFF level. On the other hand, in the interline voltage generation section TS11, according to the comparison result of the U-phase comparator CU, the switch control unit 28 selects a −side phase, that is, T-phase between time points t12 to t13 during which the U-phase control signal RWa is smaller than the second carrier waveform pattern CW21 and sets the switching signal φSTU to an ON level and sets the other switching signals φSRU and φSSU connected to U-phase to an OFF level.

In the same manner, in the interline voltage generation section TS12, according to the comparison result of the U-phase comparator CU, the switch control unit 28 selects a +side phase, that is, R-phase in a case where the U-phase control signal RWa is larger than the second carrier waveform pattern CW21 and sets the switching signal φSRU to an ON level and sets the other switching signals φSSU and φSTU connected to U-phase to an OFF level. On the other hand, in the interline voltage generation section TS12, according to the comparison result of the U-phase comparator CU, the switch control unit 28 selects a –side phase, that is, T-phase in a case where the U-phase control signal RWa is smaller than the second carrier waveform pattern CW21 and sets the switching signal φSTU to an ON level and sets the other switching signals φSRU and φSSU connected to U-phase to an OFF level.

Further, in the interline voltage generation section TS13, according to the comparison result of the U-phase comparator CU, the switch control unit 28 selects a +side phase, that is, R-phase in a case where the U-phase control signal RWa is larger than the second carrier waveform pattern CW21 and sets the switching signal φSRU to an ON level and sets the other switching signals φSSU and φSTU connected to U-phase to an OFF level. On the other hand, in the interline voltage generation section TS13, according to the comparison result of the U-phase comparator CU, the switch control unit 28 selects a –side phase, that is, S-phase in a case where the U-phase control signal RWa is smaller than the second carrier waveform pattern CW21 and sets the switching signal φSSU to an ON level and sets the other switching signals φSRU and φSTU connected to U-phase to an OFF level.

[Switching of Bidirectional Switches SRV, SSV, and STV]

On the other hand, the V-phase comparator CV compares the second carrier waveform pattern CW21 with the V-phase control signal RWb. Based on the comparison result of the V-phase comparator CV, the switch control unit 28 controls switching of the bidirectional switches SRV, SSV, and STV connected to V-phase. The switching of the bidirectional switches SRV, SSV, and STV is respectively equivalent to PWM-control of R-phase pulse, S-phase pulse, and T-phase pulse with respect to a V-phase voltage. As shown in FIG. 4(f), in the interline voltage generation section TS11, according to the comparison result of the V-phase comparator CV, the switch control unit 28 selects a +side phase, that is, S-phase between time points t1 to t11 during which the V-phase control signal RWb is larger than the second carrier waveform pattern CW21 and sets the switching signal φSSV to an ON level and sets the other switching signals φSRV and φSTV connected to V-phase to an OFF level. On the other hand, in the interline voltage generation section TS11, according to the comparison result of the V-phase comparator CV, the switch control unit 28 selects a –side phase, that is, T-phase between time points t11 to t13 during which the V-phase control signal RWb is smaller than the second carrier waveform pattern CW21 and sets the switching signal φSTV to an ON level and sets the other switching signals φSRV and φSSV connected to V-phase to an OFF level.

In the same manner, in the interline voltage generation section TS12, according to the comparison result of the V-phase comparator CV, the switch control unit 28 selects a +side phase, that is, R-phase in a case where the V-phase control RWb is larger than the second carrier waveform pattern CW21 and sets the switching signal φSRV to an ON level and sets the other switching signals φSSV and φSTV connected to V-phase to an OFF level. On the other hand, in the interline voltage generation section TS12, according to the comparison result of the V-phase comparator CV, the switch control unit 28 selects a –side phase, that is, T-phase in a case where the V-phase control signal RWb is smaller than the second carrier waveform pattern CW21 and sets the switching signal φSTV to an ON level and sets the other switching signals φSRV and φSSV connected to V-phase to an OFF level.

Further, in the interline voltage generation section TS13, according to the comparison result of the V-phase comparator CV, the switch control unit 28 selects a +side phase, that is, R-phase in a case where the U-phase control signal RWb is larger than the second carrier waveform pattern CW21 and sets the switching signal φSRV to an ON level and sets the other switching signals φSSV and φSTV connected to V-phase to an OFF level. On the other hand, in the interline voltage generation section TS13, according to the comparison result of the V-phase comparator CV, the switch control unit 28 selects a –side phase, that is, S-phase in a case where the V-phase control signal RWb is smaller than the second carrier waveform pattern CW21 and sets the switching signal φSSV to an ON level and sets the other switching signals φSRV and φSTV connected to V-phase to an OFF level.

The switching described above of the bidirectional switches SRU, SSU, STU, SRV, SSV, and STV by the switch control unit 28 is actual switching control.

[Average of UV Interline Voltage]

Here, a pulse width of the switching signal φSRU is hx obtained by contracting a pulse width x (see FIG. 4(b)) of R-phase pulse in proportion to a signal level h of the U-phase control signal RWa. In addition, a pulse width of the switching signal φSSU is by obtained by contracting a pulse width y (see FIG. 4(b)) of S-phase pulse in proportion to the signal level h of the U-phase control signal RWa. In addition, a pulse width of the switching signal φSTU is hz obtained by contracting a pulse width z (see FIG. 4(b)) of T-phase pulse in proportion to the signal level h of the U-phase control signal RWa.

In addition, since each of the switching signals φSRU, φSSU, and φSTU alternatively turn ON, an R-phase voltage a, an S-phase voltage b, and a T-phase voltage c are generated in a period of a pulse width of each of the switching signals φSRU, φSSU, and φSTU. An average of DC voltages of the switching cycle T is calculated by integrating the DC voltages for each of periods, adding the DC voltages, and dividing by the switching cycle T and can be represented in Equation (10).

average of U-phase output voltages of switching cycle T $=\{a(hx)+b(hy)+c(hz)\}/T$ $=h(ax+by+cz)/T$ (10)

As described above, by pulse width x of R-phase=|a|, pulse width y of S-phase=|b|, and pulse width z of T-phase=T|c|, Equation (10) can be transformed into the following Equation (11).

average of U-phase output voltages of switching cycle $T=h(a^2+b^2+c^2)$ (11)

Further, from an AC theory, Equation (11) can be transformed into the following Equation (12) by $a^2+b^2+c^2=3/2$.

average of U-phase output voltages of switching cycle $T=h\times3/2$ (12)

In the same manner, a pulse width of the switching signal φSRV is an absolute value of −hx obtained by contracting a pulse width x (see FIG. 4 (b)) of R-phase pulse in proportion to a signal level −h of the V-phase control signal RWb. In addition, a pulse width of the switching signal φSSV is an absolute value of −hy obtained by contracting a pulse width y (see FIG. 4 (b)) of S-phase pulse in proportion to a signal level −h of the V-phase control signal RWb. In addition, a pulse width of the switching signal φSTV is an absolute value of −hz obtained by contracting a pulse width z (see FIG. 4 (b)) of T-phase pulse in proportion to a signal level −h of the V-phase control signal RWb.

Thus, an average of V-phase output voltages of the switching cycle T is represented in the following Equation (13).

average of V-phase output voltages of switching cycle T $=\{a(-hx)+b(-hy)+c(-hz)\}/T$ $=-h(ax+by+cz)/T$ (13)

As described above, by pulse width x of R-phase=T|a|, pulse width y of S-phase=T|b|, and pulse width z of T-phase=T|c|, Equation (13) can be transformed into the following Equation (14).

average of V-phase output voltages of switching cycle $T=-h(a^2+b^2+c^2)$ (14)

Further, from an AC theory, Equation (14) can be transformed into the following Equation (15) by $a^2+b^2+c^2=3/2$.

average of V-phase output voltages of switching cycle $T=-h\times3/2$ (15)

As a result, an average of U-phase output voltages of the switching cycle T and an average of V-phase output voltages of the switching cycle T become simultaneously proportional to the signal level h and −h. As shown in FIG. 4(h), a UV interline voltage in a switching cycle T (t1 to t2) is a signal pattern obtained by subtracting the switching signals φSRV, φSSV, and φSTV from the switching signals φSRU, φSSU, and φSTU.

In addition, an average of UV interline voltages between U-phase and V-phase is obtained by subtracting a value of Equation (15) from a value of Equation (12) and represented in the following Equation (16).

average of UV interline voltage=$h\times3/2-(-h\times3/2)=h\times3$ (16)

Thus, an average of the UV interline voltages becomes proportional to the signal level h.

[Switching of Next Switching Cycle T]

As shown in FIG. 4, although the U-phase control signal RWa is +h and the V-phase control signal RWb is −h in the switching cycle T (t1 to t2) described above, the U-phase control signal RWa is −h and the V-phase control signal RWb is +h in a next switching cycle T (t2 to t3). In this case, as shown in FIG. 4(g), patterns of the switching signals φSRU, φSSU, and φSTU in the switching cycle T (t1 to t2) are patterns of the switching signals φSRV, φSSV, and φSTV in the switching cycle T (t2 to t3). In addition, patterns of the switching signals φSRV, φSSV, and φSTV in the switching cycle T (t1 to t2) are patterns of the switching signals φSRU, φSSU, and φSTU in the switching cycle T (t2 to t3).

An average of UV interline voltages in the next switching cycle T (t2 to t3) is obtained by subtracting a value of Equation (12) from a value of Equation (15) and represented in the following Equation (17).

average of UV interline voltage=$(-h\times3/2)-(h\times3/2)=-h\times3$ (17)

Thus, an average of the UV interline voltages becomes proportional to the signal level −h and becomes a negative voltage. As shown in FIG. 4(h), the UV interline voltage in a switching cycle T (t2 to t3) is a signal pattern obtained by subtracting the switching signals φSRV, φSSV, and φSTV from the switching signals φSRU, φSSU, and φSTU. Accordingly, one cycle of a single-phase AC signal as an output signal is generated in the switching cycle T (t1 to t2) and the next switching cycle T (t2 to t3). That is, the single-phase AC signal is output as a square wave signal corresponding to the U-phase control signal RWa.

In addition, within the mode m1, the switching cycle T (t1 to t2) and the next switching cycle T (t2 to t3) alternately appear.

[Modes m2 to m6]

As shown in FIGS. 5(e) and 5(f), in the mode m2, the second carrier waveform pattern generating unit 24 determines a second carrier waveform pattern CW22 including an ascending saw-tooth wave, a descending saw-tooth wave, and a descending saw-tooth wave in order of the interline voltage generation sections TS21, TS22, and TS23 as the second carrier waveform pattern CW2 to be used for virtual DC/AC conversion processing.

In the same manner as the mode m1, in the mode m2, the U-phase comparator CU compares the second carrier waveform pattern CW22 and a U-phase control signal RWa as shown in FIG. 5(e). Then, as shown in FIG. 5(g), based on the comparison result of the U-phase comparator CU, the switch control unit 28 controls switching of bidirectional switches SRU, SSU, and STU connected to U-phase. In addition, as shown in FIG. 5(f), the V-phase comparator CV compares the second carrier waveform pattern CW22 with a V-phase control signal RWb. Then, as shown in FIG. 5(g), based on the comparison result of the V-phase comparator CV, the switch control unit 28 controls switching of the bidirectional switches SRV, SSV, and STV connected to V-phase. As a result, as shown in FIG. 5(h), a UV interline voltage in the mode m2 is generated as a voltage pattern in which positive and negative are alternately switched in the switching cycle T. In addition, an average of the respective UV interline voltages in the switching cycles T becomes proportional to signal levels h and −h. Then, a single-phase AC signal is output as a square wave signal corresponding to the U-phase control signal RWa.

As shown in FIGS. 6(e) and 6(f), in the mode m3, the second carrier waveform pattern generating unit 24 determines a second carrier waveform pattern CW23 including an ascending saw-tooth wave, an ascending saw-tooth wave, and a descending saw-tooth wave in order of the interline voltage generation sections TS31, TS32, and TS33 as the second carrier waveform pattern CW2 to be used for virtual DC/AC conversion processing.

In the same manner as the mode m1, in the mode m3, the U-phase comparator CU compares the second carrier waveform pattern CW23 and a U-phase control signal RWa as shown in FIG. 6(e). Then, as shown in FIG. 6(g), based on the comparison result of the U-phase comparator CU, the switch control unit 28 controls switching of bidirectional switches SRU, SSU, and STU connected to U-phase. In addition, as shown in FIG. 6(f), the V-phase comparator CV compares the second carrier waveform pattern CW23 with a V-phase control signal RWb. Then, as shown in FIG. 6(g), based on the comparison result of the V-phase comparator CV, the switch control unit 28 controls switching of bidirectional switches SRV, SSV, and STV connected to V-phase. As a result, as shown in FIG. 6(h), a UV interline voltage in the mode m3 is generated as a voltage pattern in which positive and negative are alternately switched in the switching cycle T. In addition, an average of the respective UV interline voltages in the switching cycles T becomes proportional to signal levels h and −h. Then, a single-phase AC signal is output as a square wave signal corresponding to the U-phase control signal RWa.

As shown in FIGS. 7(e) and 7(f), in the mode m4, the second carrier waveform pattern generating unit 24 determines a second carrier waveform pattern CW24 including a descending saw-tooth wave, an ascending saw-tooth wave, and a descending saw-tooth wave in order of the interline voltage generation sections TS41, TS42, and TS43 as the second carrier waveform pattern CW2 to be used for virtual DC/AC conversion processing.

In the same manner as the mode m1, in the mode m4, the U-phase comparator CU compares the second carrier waveform pattern CW24 and a U-phase control signal RWa as shown in FIG. 7(e). Then, as shown in FIG. 7(g), based on the comparison result of the U-phase comparator CU, the switch control unit 28 controls switching of bidirectional switches SRU, SSU, and STU connected to U-phase. In addition, as shown in FIG. 7(f), the V-phase comparator CV compares the second carrier waveform pattern CW24 with a V-phase control signal RWb. Then, as shown in FIG. 7(g), based on the comparison result of the V-phase comparator CV, the switch control unit 28 controls switching of bidirectional switches SRV, SSV, and STV connected to V-phase. As a result, as shown in FIG. 7(h), a UV interline voltage in the mode m4 is generated as a voltage pattern in which positive and negative are alternately switched in the switching cycle T. In addition, an average of the respective UV interline voltages in the switching cycles T becomes proportional to signal levels h and −h. Then, a single-phase AC signal is output as a square wave signal corresponding to the U-phase control signal RWa.

As shown in FIGS. 8(e) and 8(f), in the mode m5, the second carrier waveform pattern generating unit 24 determines a second carrier waveform pattern CW25 including a descending saw-tooth wave, an ascending saw-tooth wave, and an ascending saw-tooth wave in order of the interline voltage generation sections TS51, TS52, and TS53 as the second carrier waveform pattern CW2 to be used for virtual DC/AC conversion processing.

In the same manner as the mode m1, in the mode m5, the U-phase comparator CU compares the second carrier waveform pattern CW25 and a U-phase control signal RWa as shown in FIG. 8(e). Then, as shown in FIG. 8(g), based on the comparison result of the U-phase comparator CU, the switch control unit 28 controls switching of bidirectional switches SRU, SSU, and STU connected to U-phase. In addition, as shown in FIG. 8(f), the V-phase comparator CV compares the second carrier waveform pattern CW25 with a V-phase control signal RWb. Then, as shown in FIG. 8(g), based on the comparison result of the V-phase comparator CV, the switch control unit 28 controls switching of bidirectional switches SRV, SSV, and STV connected to V-phase. As a result, as shown in FIG. 8(h), a UV interline voltage in the mode m5 is generated as a voltage pattern in which positive and negative are alternately switched in the switching cycle T. In addition, an average of the respective UV interline voltages in the switching cycles T becomes proportional to signal levels h and −h. Then, a single-phase AC signal is output as a square wave signal corresponding to the U-phase control signal RWa.

As shown in FIGS. 9(e) and 9(f), in the mode m6, the second carrier waveform pattern generating unit 24 determines a second carrier waveform pattern CW26 including a descending saw-tooth wave, a descending saw-tooth wave, and an ascending saw-tooth wave in order of the interline voltage generation sections TS61, TS62, and TS63 as the second carrier waveform pattern CW2 to be used for virtual DC/AC conversion processing.

In the same manner as the mode m1, in the mode m6, the U-phase comparator CU compares the second carrier waveform pattern CW26 and a U-phase control signal RWa as shown in FIG. 9(e). Then, as shown in FIG. 9(g), based on the comparison result of the U-phase comparator CU, the switch control unit 28 controls switching of bidirectional switches SRU, SSU, and STU connected to U-phase. In addition, as shown in FIG. 9(f), the phase comparator CV compares the second carrier waveform pattern CW26 with a V-phase control signal RWb. Then, as shown in FIG. 9(g), based on the comparison result of the V-phase comparator CV, the switch control unit 28 controls switching of bidirectional switches SRV, SSV, and STV connected to V-phase. As a result, as shown in FIG. 9(h), a UV interline voltage in the mode m6 is generated as a voltage pattern in which positive and negative are alternately switched in the switching cycle T. In addition, an average of the respective UV interline voltages in the switching cycles T becomes proportional to signal levels h and −h. Then, a single-phase AC signal is output as a square wave signal corresponding to the U-phase control signal RWa.

As a result, the three-phase/single-phase matrix converter 1 can directly convert three-phase AC power into single-phase AC power having the voltage amplitude value Vh (signal level h) set by the voltage setting unit 50.

A current direction detection unit 30 shown in FIG. 1 detects a current direction of V-phase and outputs the current direction to the switch control unit 28. The switch control unit 28 controls commutation failure according to whether or not a current direction of V-phase matches a current direction of an output single-phase AC signal.

In addition, in the embodiment described above, the switching signals φSRU, φSSU, and φSTU are modulated by the second carrier waveform pattern CW2. Since by this modulation, switching with respect to R-phase, S-phase, and T-phase is sequentially modulated in predetermined order of R-phase→S-phase→T-phase→R-phase . . . without overlapping with each other so as to be connected in order, it is possible to suppress commutation failure. In addition, since switching of the switching signals φSRV, φSSV, and φSTV is modulated so as to be connected in order in the same manner, it is possible to suppress commutation failure.

In addition, pulse widths of the switching signals φSRU, φSSU, φSTU, φSRV, φSSV, and φSTV may be larger than a cycle of a switching frequency limit of the bidirectional switch group SW. Accordingly, since the pulse widths are secured longer than a switching time limit of the bidirectional switch group SW, it is possible to suppress commutation failure.

In the embodiment described above, input three-phase AC signal with 50 Hz is output to the load LD as a single-phase AC signal in an 85 kHz bandwidth. In general, a switching frequency limit of a semiconductor switch such as GaN or SiC is 500 kHz. One half cycle of 85 kHz is approximately 6 µs. As described above, each of the switching cycles T is set to 6 μs, which is one half cycle of 85 kHz. A cycle of 500 kHz, which is a switching frequency limit, is approximately 2 μs. In the present embodiment, since switching is performed once (minimum 2 μs) within the switching cycle T (approximately 6 μs), switching with an allowance can be performed. As a result, accuracy of an output voltage can be guaranteed. That is, it is possible to directly convert three-phase AC power into high-frequency single-phase AC power with high voltage accuracy with respect to a requested voltage. In the present embodiment, the switching cycle T is set to one half cycle of 85 kHz. However, if switching with an allowance is possible, the switching cycle T may be an integer fraction of half-cycle.

In addition, by using the output single-phase AC signal as a square wave signal, the output voltage can be constant so that levels of the U-phase control signal RWa and the V-phase control signal RWb are constant levels (h, −h) in the switching cycle T.

(Control of Number of Switching)

Here, control of the number of switching of the bidirectional switch group SW within the switching cycle T will be described. In virtual DC/AC conversion processing, three types (R-phase pulse, S-phase pulse, and T-phase pulse) of pulses of an input side in one carrier waveform pattern (one switching cycle T) are modulated to respective phases (U-phase and V-phase) of an output side for three types of the interline voltage generation sections φTS.

If one carrier waveform pattern is configured to have the same triangular wave for each of three types of the interline voltage generation sections φTS, three times of switching are requested for each of the switching cycles T with respect to the bidirectional switches SRU to STV.

By contrast, in the present embodiment, as shown in FIGS. 4 to 9, looking at selection (a +side phase and a −side phase) of respective input voltage phases, R-phase, S-phase, and T-phase appear while overlapping with one carrier waveform pattern. That is, as show in FIGS. 4(*e*) and 4(*f*) to 9(*e*) and 9(*f*), each of a plurality of the second carrier waveform patterns CW21 to CW26 has a pattern in which a level changes to a mountain shape across two successive sections among the plurality of interline voltage generation sections. Each of the modes m1 to m6 includes a plurality of switching cycles T.

For example, as shown in FIGS. 4(*e*) and 4(*f*), the second carrier waveform pattern CW21 has a pattern in which a level changes to a mountain shape on an upper side across the interline voltage generation sections TS11 and TS12 and a pattern in which a level changes to a mountain shape on a lower side across the interline voltage generation sections TS12 and TS13.

In addition, as shown in FIGS. 5(*e*) and 5(*f*), the second carrier waveform pattern CW22 has a pattern in which a level changes to a mountain shape on an upper side across the interline voltage generation sections TS21 and TS22 and a pattern in which a level changes to a mountain shape on a lower side across the interline voltage generation sections TS23 and TS21.

In addition, as shown in FIGS. 6(*e*) and 6(*f*), the second carrier waveform pattern CW23 has a pattern in which a level changes to a mountain shape on an upper side across the interline voltage generation sections TS32 and TS33 and a pattern in which a level changes to a mountain shape on a lower side across the interline voltage generation sections TS33 and TS31.

In addition, as shown in FIGS. 7(*e*) and 7(*f*), the second carrier waveform pattern CW24 has a pattern in which a level changes to a mountain shape on an upper side across the interline voltage generation sections TS42 and TS43 and a pattern in which a level changes to a mountain shape on a lower side across the interline voltage generation sections TS41 and TS42.

In addition, as shown in FIGS. 8(*e*) and 8(*f*), the second carrier waveform pattern CW25 has a pattern in which a level changes to a mountain shape on an upper side across the interline voltage generation sections TS53 and TS51 and a pattern in which a level changes to a mountain shape on a lower side across the interline voltage generation sections TS51 and TS52.

In addition, as shown in FIGS. 9(*e*) and 9(*f*), the second carrier waveform pattern CW26 has a pattern in which a level changes to a mountain shape on an upper side across the interline voltage generation sections TS63 and TS61 and a pattern in which a level changes to a mountain shape on a lower side across the interline voltage generation sections TS62 and TS63.

More specifically, when a voltage phase having a large voltage value is set as a +side phase and a voltage phase having a small voltage value is set as a phase among two voltage phases in each of a plurality of interline voltage generation sections, in a case where there is a phase common to the +side phase or the −side phase when interline voltage generation section is switched, each of the second carrier waveform patterns CW21 to CW26 has a pattern in which a level is continuous in a mountain shape across two interline voltage generation sections to be switched. In a case where there is a phase reversed between the +side phase and the −side phase when interline voltage generation section is switched, each of the second carrier waveform patterns CW21 to CW26 has a pattern in which a level changes to a saw-tooth shape at a boundary between two interline voltage generation sections to be switched.

For example, since there is T-phase common to a −side phase in the interline voltage generation sections TS11 and TS12, the second carrier waveform pattern CW21 has a pattern in which a level changes to a mountain shape on an upper side across the interline voltage generation sections TS11 and TS12. Since there is R-phase common to a +side phase in the interline voltage generation sections TS12 and TS13, the second carrier waveform pattern CW21 has a pattern in which a level changes to a mountain shape on a lower side across the interline voltage generation sections TS12 and TS13. Since there is S-phase reversed between a +side phase and a −side phase in the interline voltage generation sections TS13 and TS11, the second carrier waveform pattern CW21 has a pattern in which a level changes to a saw-tooth shape at a boundary between the interline voltage generation sections TS13 and TS11.

In addition, since there is T-phase common to a −side phase in the interline voltage generation sections TS21 and TS22, the second carrier waveform pattern CW22 has a pattern in which a level changes to a mountain shape on an upper side across the interline voltage generation sections TS21 and TS22. Since there is R-phase reversed between a +side phase and a −side phase in the interline voltage generation sections TS22 and TS23, the second carrier waveform pattern CW22 has a pattern in which a level changes to a saw-tooth shape at a boundary between the interline voltage generation sections TS22 and TS23. Since there is S-phase common to a +side phase in the interline voltage generation sections TS23 and TS21, the second carrier waveform pattern CW22 has a pattern in which a level changes to a mountain shape on a lower side across the interline voltage generation sections TS23 and TS21.

In addition, since there is T-phase reversed between a +side phase and a −side phase in the interline voltage generation Sections TS31 and TS32, the second carrier waveform pattern CW23 has a pattern in which a level changes to a saw-tooth shape at a boundary between the interline voltage generation sections TS31 and TS32. Since there is R-phase common to a −side phase in the interline voltage generation sections TS32 and TS33, the second carrier waveform pattern CW23 has a pattern in which a level changes to a mountain shape on an upper side across the interline voltage generation sections TS32 and TS33. Since there is S-phase common to a +side phase in the interline voltage generation sections TS33 and TS31, the second carrier waveform pattern CW23 has a pattern in which a level changes to a mountain shape on a lower side across the interline voltage generation sections TS33 and TS31.

In addition, since there is T-phase common to a +side phase in the interline voltage generation sections TS41 and TS42, the second carrier waveform pattern CW24 has a pattern in which a level changes to a mountain shape on a lower side across the interline voltage generation sections TS41 and TS42. Since there is R-phase common to a −side phase in the interline voltage generation sections TS42 and TS43, the second carrier waveform pattern CW24 has a pattern in which a level changes to a mountain shape on an upper side across the interline voltage generation sections TS42 and TS43. Since there is S-phase reversed between a +side phase and a −side phase in the interline voltage generation sections TS43 and TS41, the second carrier waveform pattern CW24 has a pattern in which a level changes to a saw-tooth shape at a boundary between the interline voltage generation sections TS43 and TS41.

In addition, since there is T-phase common to a +side phase in the interline voltage generation sections TS51 and TS52, the second carrier waveform pattern CW25 has a pattern in which a level changes to a mountain shape on a lower side across the interline voltage generation sections TS51 and TS52. Since there is R-phase reversed between a +side phase and a −side phase in the interline voltage generation sections TS52 and TS53, the second carrier waveform pattern CW25 has a pattern in which a level changes to a saw-tooth shape at a boundary between the interline voltage generation sections TS52 and TS53. Since there is S-phase common to a −side phase in the interline voltage generation sections TS53 and TS51, the second carrier waveform pattern CW25 has a pattern in which a level changes to a mountain shape on an upper side across the interline voltage generation sections TS53 and TS51.

In addition, since there is T-phase reversed between a +side phase and a −side phase in the interline voltage generation sections TS61 and TS62, the second carrier waveform pattern CW26 has a pattern in which a level changes to a saw-tooth shape at a boundary between the interline voltage generation sections TS61 and TS62. Since there is R-phase common to a +side phase in the interline voltage generation sections TS62 and TS63, the second carrier waveform pattern CW26 has a pattern in which a level changes to a mountain shape on a lower side across the interline voltage generation sections TS62 and TS63. Since there is S-phase common to a −side phase in the interline voltage generation sections TS63 and TS61, the second carrier waveform pattern CW26 has a pattern in which a level changes to a mountain shape on an upper side across the interline voltage generation sections TS63 and TS61.

Further, when a voltage phase having a large level is set as a +side phase and a voltage phase having a small level is set as a −side phase among two voltage phases in each of the plurality of interline voltage generation sections, in a case where there is a phase common to the +side phase or the −side phase when a mode is switched, each of the second carrier waveform patterns CW21 to CW26 has a pattern in which a level is continuous in a mountain shape across two modes to be switched. In a case where there is a phase reversed between the +side phase and the −side phase when a mode is switched, each of the second carrier waveform patterns CW21 to CW26 has a pattern in which a level changes to a saw-tooth shape at a boundary between two modes to be switched.

For example, when switching from the mode m1 to the mode m2, since there is S-phase reversed between a +side phase and a −side phase in the interline voltage generation sections TS13 and TS21, there is a pattern in which a level changes to a saw-tooth shape at a boundary between the interline voltage generation sections TS13 and TS21.

In addition, when switching from the mode m2 to the mode m3, since there is S-phase common to a +side phase in the interline voltage generation sections TS23 and TS31, there is a pattern in which a level changes to a mountain shape on a lower side across the interline voltage generation sections TS23 and TS31.

In addition, when switching from the mode m3 to the mode m4, since there is S-phase reversed between a +side phase and a −side phase in the interline voltage generation sections TS33 and TS41, there a pattern in which a level changes to a saw-tooth shape at a boundary between the interline voltage generation sections TS33 and TS41.

In addition, when switching from the mode m4 to the mode m5, since there is S-phase reversed between a +side phase and a −side phase in the interline voltage generation sections TS43 and TS51, there is a pattern in which a level changes to a saw-tooth shape at a boundary between the interline voltage generation sections TS43 and TS51.

In addition, when switching from the mode m5 to the mode m6, since there is S-phase common to a −side phase in the interline voltage generation sections TS53 and TS61, there is a pattern in which a level changes to a mountain shape on an upper side across the interline voltage generation sections TS53 and TS61.

In this way, one carrier waveform pattern (second carrier waveform pattern CW2) is configured to have combinations of an ascending saw-tooth wave and a descending saw-tooth wave, so that it is possible to make selection of each of phases in each of switching cycles T one time. That is, a maximum voltage phase is always a +side phase and a minimum voltage phase is always a −side phase. An intermediate voltage phase becomes a −side phase with respect to the maximum voltage phase and a +side phase with respect to the minimum voltage phase. In a +side phase, a period during which the second control signal (for example, U-phase control signal RWa) is larger than the second carrier waveform pattern CW2 is selected and in a −side phase, a period during which the second control signal (for example, U-phase control signal RWa) is smaller than the second carrier waveform pattern CW2 is selected. In this case, when continuing a descending saw-tooth wave and an ascending saw-tooth wave so as to be a mountain shape on a lower side, it is possible to select a maximum voltage phase only once. In addition, when continuing an ascending saw-tooth wave and a descending saw-tooth wave so as to be a mountain shape on an upper side, it is possible to select a minimum voltage phase only once. Accordingly, in each of modes, it is possible to realize one time of switching for each of the bidirectional switches SRU to STV at every switching cycle T. In addition, even when switching a mode, it is possible to practically realize one time of switching for each of the bidirectional switches SRU to STV at every switching cycle T. In other words, since control can be realized in the same manner by switching in a mode or between modes, it is possible to reduce fluctuation (fluctuation due to dead time and the like) of an output voltage caused by intermittence accompanying switching and to also reduce a shock of switching.

In addition, since the switching signals φSRU to φSTU of the bidirectional switches SRU to STU can be respectively maintained to be an ON level across the plurality of interline voltage generation sections, it is possible to ensure a wide pulse width of the switching signals φSRU to φSTU of the bidirectional switches SRU to STU as shown in FIGS. 4(g) to 9(g). The same applies to the switching signals φSRV to φSTV of the bidirectional switches SRV to STV. That is, since a pulse width can be secured larger than dead time even at a low load, it is possible to suppress a distortion ratio of a waveform at low load to the same level as at a high load.

In virtual AC/DC conversion processing of the embodiment described above, an average of output voltages in each of switching cycles T is always constant. In addition, a DC current is distributed to an input current by a ratio of an input voltage. Further, when an output power is constant, this input current is a three-phase AC waveform (for example, sinusoidal wave).

That is, 1) when an output power by virtual DC/AC conversion processing is constant, an input current in virtual AC/DC conversion processing can be a three-phase AC waveform (for example, sinusoidal wave). Normally, in a short time (approximately 0.1 seconds), power is constant.

2) An output voltage by the virtual DC/AC conversion processing can be obtained with the same signal as a modulation signal (second control signal).

As described above, in the embodiment described above, the control unit 20 performs virtual AC/DC conversion processing different from each other for a plurality of modes I to VI classified according to a magnitude relationship between voltages of respective phases in input three-phase AC power to the input three-phase AC power and generates a switching pattern of the bidirectional switch circuit 10 so as to perform virtual DC/AC conversion processing different from each other for the plurality of modes m1 to m6 to the power to which the virtual AC/DC conversion processing performed. Specifically, the control unit 20 performs virtual AC/DC conversion processing to input three-phase AC power using the first carrier waveform patterns CW11 to CW13 different from each other for the plurality of modes m1 to m6 and generates a switching pattern of the bidirectional switch circuit 10 so as to perform virtual DC/AC conversion processing to the power to which the virtual AC/DC conversion processing is performed using the second carrier waveform patterns CW21 to CW26 different from each other for the plurality of modes m1 to m6. Accordingly, it is possible to directly convert three-phase AC power into single-phase AC power by simple processing without performing a complicated calculation such as a matrix operation.

In addition, in the embodiment described above, the control unit 20 compares the first carrier waveform patterns CW11 to CW13 with the first control signal (for example, voltage |a|, voltage |c|, voltage (|c|+|a|−1), and voltage (|a|+|b|−1) shown in FIGS. 4(a) to 9(a)) corresponding to phases (R-phase, S-phase, and T-phase) of an input side and obtains the plurality of interline voltage generation sections TS11 to TS63 In each of the plurality of modes m1 to m6.

Then, the control unit 20 generates second carrier waveform patterns CW21 to CW26 corresponding to the plurality of interline voltage generation sections TS11 to TS63, compares the generated second carrier waveform patterns CW21 to CW26 with the second control signal (for example, U-phase control signal RWa and V-phase control signal RWb shown in FIGS. 4(e) and 4(f) to 9(e) and 9(f)) corresponding to phases (U-phase and V-phase) of an output side, and generates a switching pattern of the bidirectional switch circuit 10. Accordingly, it is possible to simply perform virtual AC/DC conversion processing and virtual DC/AC conversion processing without performing a complicated matrix operation.

Further, in the embodiment described above, the control unit 20 recognizes a maximum voltage phase, a minimum voltage phase, and an intermediate voltage phase in the input three-phase AC power. Then, the control unit 20 divides the plurality of interline voltage generation sections in one switching cycle T into a first section corresponding to an intermediate voltage phase and a minimum voltage phase, a second section corresponding to a maximum voltage phase and a minimum voltage phase, and a third section corresponding to a maximum voltage phase and an intermediate voltage phase and obtains the plurality of interline voltage generation sections during one switching cycle T. The first section includes, for example, the interline voltage generation sections TS11, TS22, TS32, TS43, TS53, and TS61 shown in FIGS. 4 to 9. The second section includes, for example, the interline voltage generation sections TS12, TS21, TS33, TS42, TS51, and TS63 shown in FIGS. 4 to 9. The third section includes, for example, the interline voltage generation sections TS13, TS23, TS31, TS41, TS52, and TS62 shown in FIGS. 4 to 9. Accordingly, it is possible to virtually generate three types of interline voltages of maximum-minimum, maximum-intermediate, and intermediate-minimum during one switching cycle T, for a virtual DC voltage to make a virtual DC voltage approximately constant by a virtual interline voltage using a physical phenomenon such as subtraction of currents, and to generate a switching signal from the approximately constant virtual DC voltage by comparing the second carrier waveform pattern and the second control signal generated in each of voltage sections. Accordingly, by setting the first control signal as a sinusoidal wave and the second control signal as a square wave, it is possible to simply set an input current of the three-phase/single-phase matrix converter 1 as a sinusoidal wave and to set an output voltage as a square wave.

In addition, in the embodiment described above, the second carrier waveform patterns CW21 to CW26 (see FIGS. 4(e) and 4(f) to 9(e) and 9(f)) have patterns in which a level changes to a mountain shape across two successive sections among the plurality of interline voltage generation sections. Accordingly, since the number of switching in each of switching cycles T can be reduced, it is possible to reduce switching failure of each of the bidirectional switches SRU to STV in the bidirectional switch circuit 10.

Further, in the embodiment described above, since the second carrier waveform patterns CW21 to CW26 (see FIGS. 4(e) and 4(f) to 9(e) and 9(f)) have patterns in which a level changes to a mountain shape across two successive sections among the plurality of interline voltage generation sections, it is possible to ensure a wide pulse width of the switching signals φSRU to φSTV of each of the bidirectional switches SRU to STV in the bidirectional switch circuit 10. Accordingly, since commutation failure can be reduced, it is possible to suppress malfunction of the load LD. In addition, power conversion efficiency can be improved. Particularly, a single-phase coil is used for a coil used for contactless power supply to a vehicle or the like in order to avoid an increase in size. Accordingly, by using the load LD as the single-phase coil for contactless power supply and using the three-phase/single-phase matrix converter 1 of the present embodiment, it is possible to realize downsizing of both of a power supply receiving side and a power supplying side.

In addition, in the embodiment described above, the control unit 20 recognizes a maximum voltage phase, a minimum voltage phase, and an intermediate voltage phase in the input three-phase AC power. When a voltage phase having a large level is set as a +side phase and a voltage phase having a small level is set as a –side phase among two voltage phases in each of the plurality of interline voltage generation sections, in a case where there is a phase common to the +side phase or the –side phase when a mode is switched, the second carrier waveform patterns CW21 to CW26 generated by the control unit 20 have patterns in which a level is continuous in a mountain shape across two modes to be switched. In a case where there is a phase reversed between the +side phase and the –side phase when a mode is switched, each of the second carrier waveform patterns CW21 to CW26 has a pattern in which a level changes to a saw-tooth shape at a boundary between two modes to be switched. Accordingly, even when switching a mode, it is possible to practically realize one time of switching for each of the bidirectional switches SRU to STV at every switching cycle T. In other words, since control can be realized in the same manner by switching in a mode or between modes, it is possible to also reduce a shock of switching.

Further, in the embodiment described above, a zero cross point of differential voltages can be obtained at an intersection point of two phases of an input AC voltage and the input AC voltage of each of the phases can be estimated using this zero-crossing point as a sync signal. In this case, a matrix converter can be simply configured as compared with a case of detecting an input AC voltage of each of phases.

In addition, in the embodiment described above, it is possible to input the second control signal without calculating with another physical quantity. Accordingly, the second control signal can be the same as AC power to be supplied to the load, so that it is easy to make, for example, an output voltage a square wave. Particularly, the three-phase/single-phase matrix converter 1 can directly convert three-phase AC signal power into single-phase AC signal power which is a square wave having the voltage amplitude value Vh (signal level h) set by the voltage setting unit 50 with a frequency of an 85 kHz bandwidth. A single-phase AC signal is not limited to an 85 kHz bandwidth. In addition, both the U-phase control signal RWa and the V-phase control signal RWb need not to be square waves. Accordingly, if at least one of the U-phase control signal RWa and the V-phase control signal RWb is a square wave, the other may be a direct current in which a signal level does not fluctuate during a switching cycle T.

EXPLANATION OF REFERENCE

1: three-phase/single-phase matrix converter
10: bidirectional switch circuit
20: control unit
21: synchronization signal detection unit
22: first carrier waveform pattern generating unit
23: phase information generating unit
24: second carrier waveform pattern generating unit
25: square wave signal generating unit
26: multiplier
27: inverter
28: switch control unit
30: current direction detection unit
40: input capacitor
41 to 43: capacitors
50: voltage setting unit
51: full-wave rectifier
52: filter circuit
53: voltage regulator
CU: U-phase comparator
CV: V-phase comparator
LD: load
PS: three-phase AC power supply
RWa: U-phase control signal
RWb: V-phase control signal
SW: bidirectional switch group
SRU, SSU, STU, SRV, SSV, and STV: bidirectional switch

The invention claimed is:

1. A three-phase/single-phase matrix converter which directly converts input three-phase AC power into single-phase AC power and outputs the single-phase AC power to a load, the converter comprising:

a bidirectional switch circuit which turns ON/OFF supply of the input three-phase AC power to the load; and a control unit which, for the input three-phase AC power, generates a first carrier waveform pattern having patterns different from each other for respective modes according to a plurality of modes classified according to a magnitude relationship between voltages of respective phases in the input three-phase AC power at a predetermined switching cycle, performs virtual AC/DC conversion processing in which a plurality of interline voltage generation sections selecting two phases among the input three-phase AC power are obtained from the first carrier waveform pattern and a first control signal corresponding to a phase of an input side within the predetermined switching cycle, generates second carrier waveform patterns different from each other for the plurality of modes corresponding to the plurality of interline voltage generation sections obtained by the virtual AC/DC conversion processing, and generates a switching pattern of the bidirectional switch circuit so as to perform different virtual DC/AC conversion processing according to the plurality of modes from the generated second carrier waveform pattern and a second control signal corresponding to a phase of an output side to interline voltages of the two phases selected in the plurality of interline voltage generation sections, wherein the predetermined switching cycle is an integer fraction of half-cycle of a single-phase AC signal used for generating the single-phase AC power.

2. The three-phase/single-phase matrix converter according to claim 1, wherein the second control signal is a first square wave signal having a frequency of the single-phase AC signal and a second square wave signal reversed from the first square wave signal.

3. The three-phase/single-phase matrix converter according to claim 1, wherein the control unit recognizes a maximum voltage phase, a minimum voltage phase, and an intermediate voltage phase in the input three-phase AC power and divides the plurality of interline voltage generation sections into a first section corresponding to an intermediate voltage phase and a minimum voltage phase, a second section corresponding to a maximum voltage phase and a minimum voltage phase, and a third section corresponding to a maximum voltage phase and an intermediate voltage phase and obtains the plurality of interline voltage generation sections.

4. The three-phase/single-phase matrix converter according to claim 1, wherein the second carrier waveform pattern has a pattern in which a level changes to a mountain shape across two successive sections among the plurality of interline voltage generation sections.

5. The three-phase/single-phase matrix converter according to claim 1, wherein when a voltage phase having a large voltage value is set as a +side phase and a voltage phase having a small voltage value is set as a −side phase among two voltage phases in each of the plurality of interline voltage generation sections, in a case where there is a phase common to the +side phase or the −side phase when the interline voltage generation section is switched, the second carrier waveform pattern has a pattern in which a level is continuous in a mountain shape across the two interline voltage generation sections to be switched and in a case where there is a phase reversed between the +side phase and the −side phase when the interline voltage generation section is switched, the second carrier waveform pattern has a pattern in which a level changes to a saw-tooth shape at a boundary between the two interline voltage generation sections to be switched.

6. The three-phase/single-phase matrix converter according to claim 2, wherein the control unit recognizes a maximum voltage phase, a minimum voltage phase, and an intermediate voltage phase in the input three-phase AC power and divides the plurality of interline voltage generation sections into a first section corresponding to an intermediate voltage phase and a minimum voltage phase, a second section corresponding to a maximum voltage phase and a minimum voltage phase, and a third section corresponding to a maximum voltage phase and an intermediate voltage phase and obtains the plurality of interline voltage generation sections.

7. The three-phase/single-phase matrix converter according to claim 2, wherein the second carrier waveform pattern has a pattern in which a level changes to a mountain shape across two successive sections among the plurality of interline voltage generation sections.

8. The three-phase/single-phase matrix converter according to claim 3, wherein the second carrier waveform pattern has a pattern in which a level changes to a mountain shape across two successive sections among the plurality of interline voltage generation sections.

9. The three-phase/single-phase matrix converter according to claim 2, wherein when a voltage phase having a large voltage value is set as a +side phase and a voltage phase having a small voltage value is set as a −side phase among two voltage phases in each of the plurality of interline voltage generation sections, in a case where there is a phase common to the +side phase or the −side phase when the interline voltage generation section is switched, the second carrier waveform pattern has a pattern in which a level is continuous in a mountain shape across the two interline voltage generation sections to be switched and in a case where there is a phase reversed between the +side phase and the −side phase when the interline voltage generation section is switched, the second carrier waveform pattern has a pattern in which a level changes to a saw-tooth shape at a boundary between the two interline voltage generation sections to be switched.

10. The three-phase/single-phase matrix converter according to claim 3, wherein when a voltage phase having a large voltage value is set as a +side phase and a voltage phase having a small voltage value is set as a −side phase among two voltage phases in each of the plurality of interline voltage generation sections, in a case where there is a phase common to the +side phase or the −side phase when the interline voltage generation section is switched, the second carrier waveform pattern has a pattern in which a level is continuous in a mountain shape across the two interline voltage generation sections to be switched and in a case where there is a phase reversed between the +side phase and the −side phase when the interline voltage generation section is switched, the second carrier waveform pattern has a pattern in which a level changes to a saw-tooth shape at a boundary between the two interline voltage generation sections to be switched.

11. The three-phase/single-phase matrix converter according to claim 4, wherein when a voltage phase having a large voltage value is set as a +side phase and a voltage phase having a small voltage value is set as a −side phase among two voltage phases in each of the plurality of interline voltage generation sections, in a case where there is a phase common to the +side phase or the −side phase when the interline voltage generation section is switched, the second carrier waveform pattern has a pattern in which a level is continuous in a mountain shape across the two interline voltage generation sections to be switched and in a case where there is a phase reversed between the +side phase and the −side phase when the interline voltage generation section is switched, the second carrier waveform pattern has a pattern in which a level changes to a saw-tooth shape at a boundary between the two interline voltage generation sections to be switched.

\* \* \* \* \*